(12) United States Patent
Horikiri

(10) Patent No.: US 7,392,535 B2
(45) Date of Patent: Jun. 24, 2008

(54) ACCESS PRIVILEGE TRANSFERRING METHOD

(75) Inventor: Kazunori Horikiri, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 181 days.

(21) Appl. No.: 11/407,985

(22) Filed: Apr. 21, 2006

(65) Prior Publication Data

US 2006/0190995 A1    Aug. 24, 2006

Related U.S. Application Data

(62) Division of application No. 09/655,803, filed on Sep. 6, 2000, now Pat. No. 7,058,971.

(30) Foreign Application Priority Data

Sep. 29, 1999   (JP)   ............................... 11-275702

(51) Int. Cl.
*H04L 9/00*      (2006.01)
*H04L 9/32*      (2006.01)
*H04K 1/00*      (2006.01)
*G06F 15/16*     (2006.01)
*G06F 9/00*      (2006.01)

(52) U.S. Cl. ........................... 726/7; 709/229; 713/168; 713/171

(58) Field of Classification Search ................ None
See application file for complete search history.

(56) References Cited

U.S. PATENT DOCUMENTS

| 5,263,157 A | 11/1993 | Janis |
| 5,675,721 A | 10/1997 | Freedman et al. |
| 5,761,669 A | 6/1998 | Montague et al. |
| 5,774,552 A | 6/1998 | Grimmer |

(Continued)

FOREIGN PATENT DOCUMENTS

JP    5-81204    4/1993

(Continued)

OTHER PUBLICATIONS

"The Amoeba Distributed Operating System", Andrew S. Tanenbaum et al, no date given by applicant.

(Continued)

*Primary Examiner*—Christian LaForgia
(74) *Attorney, Agent, or Firm*—Oliff & Berridge, PLC

(57) ABSTRACT

Disclosed herein is an access privilege transferring method for safely transmitting privilege information about each object between subjects (users) over an object space in which service objects are scattered. User information and secret information of clients are shared between the clients and servers. A client that transfers privilege information generates privilege information weakened in its own contents of privilege. Further, the client applies a one-way function or an encryption function to a bit string obtained by joining the generated privilege information and the secret information to each other, thereby generating protected privilege information with which a third party who does not know the secret information is not capable of tampering. Utilizing the protected privilege information makes it possible to safely transfer access privileges. Further, the server analyzes the protected privilege information by using the secret information to thereby make it possible to safely confirm whether a client that makes an object request is authorized.

5 Claims, 10 Drawing Sheets

U.S. PATENT DOCUMENTS

| | | | |
|---|---|---|---|
| 5,790,667 A | | 8/1998 | Omori et al. |
| 5,862,323 A | * | 1/1999 | Blakley et al. ............... 726/13 |
| 5,862,330 A | | 1/1999 | Anupam et al. |
| 5,889,860 A | * | 3/1999 | Eller et al. ................... 705/51 |
| 6,064,736 A | | 5/2000 | Davis et al. |
| 6,173,400 B1 | | 1/2001 | Perlman et al. |
| 6,269,445 B1 | | 7/2001 | Nishioka et al. |
| 6,292,790 B1 | | 9/2001 | Krahn et al. |
| 6,327,613 B1 | | 12/2001 | Gshey et al. |
| 6,330,677 B1 | * | 12/2001 | Madoukh ....................... 726/2 |
| 6,377,691 B1 | * | 4/2002 | Swift et al. ................ 380/277 |
| 6,393,565 B1 | | 5/2002 | Lockhart et al. |
| 6,499,721 B2 | | 9/2002 | Pensak et al. |
| 6,463,471 B1 | | 10/2002 | Dreke et al. |
| 6,473,783 B2 | | 10/2002 | Goshey et al. |
| 6,513,039 B1 | | 1/2003 | Kraenzel |
| 6,519,647 B1 | | 2/2003 | Howard et al. |
| 6,594,763 B1 | * | 7/2003 | Madoukh ....................... 726/1 |
| 6,643,774 B1 | * | 11/2003 | McGarvey .................. 713/155 |
| 6,711,263 B1 | | 3/2004 | Nordenstam et al. |
| 6,711,679 B1 | * | 3/2004 | Guski et al. ................. 713/156 |
| 6,799,270 B1 | | 9/2004 | Bull et al. |
| 2002/0077988 A1 | * | 6/2002 | Sasaki et al. ................... 705/59 |

FOREIGN PATENT DOCUMENTS

| | | |
|---|---|---|
| JP | 9-251425 | 9/1997 |
| JP | 9-319659 | 12/1997 |

OTHER PUBLICATIONS

"Using the Web to Provide Private Information -or- A Short Paper About Password Protection Without Client Modifications" Bjorn N. Freeman-Benson., http://ursaminor.scs.carleton.ca/Papers/www94-paper.html, no date given by applicant.

* cited by examiner

ACCESS PRIVILEGE TRANSFERRING METHOD

This is a Division of application Ser. No. 09/655,803 filed Sep. 6, 2000. The disclosure of the prior application is hereby incorporated by reference herein in its entirety.

BACKGROUND

The present invention relates to an access privilege transferring method for safely transferring "capability" descriptive of access privileges related to objects between subjects (users) over an object space in which service objects are scattered.

More specifically, the present invention relates to an access privilege transferring method for safely transferring "capability" descriptive of access privileges related to objects between hosts (users) under a distributed computing environment in which the plural hosts are connected to one another by a network and objects are scattered over the network.

With rapid advances in a recent information technology (IT) field, various general-purpose computer systems such as work stations, personal computers, etc., have been developed and manufactured and are now widely used in laboratories of universities, etc., enterprises' offices, homes in general.

Digitized various resource objects such as a text format, a document file, a voice file, an image file can be handled over a computer system.

In recent years, most of computer systems have been connected to a network such as a LAN (Local Are Network), an Internet and placed under a distributed computing environment. Under the distributed computing environment, it is not necessary for respective users to recognize the places of resource objects such as programs, data in particular. Further, procedures and methods executed by computers have been held and managed in distributed form over the network.

For example, a method called "Remote Procedure Call (RPC)" or "Remote Method Invocation (RMI)" that a process operated over a given computer placed on a network invokes a procedure of a process operated on another computer and puts it into action, has also been widely adopted. An interface for the executed procedure is described in advance and placed in both computers on the invocation and execution sides, whereby such remote procedure call can be suitably implemented.

On the other hand, a managing method or system related to "Access Privileges", for controlling whom (subject) an access operation or accessing (Verb) corresponding to what extent, to shared resource objects (Objects) such as files is allowed, becomes an important technical problem. Control on the access privileges can be described and managed judging the control as a relation established between S (Subject: main body)—V (Verb: accessing or access operation)—O (Object: file or the like intended for operation). It is noted that the S, i.e., subject is grasped as substantially synonymous with a user who desires to do a file operation, a user account or user identification information.

For example, the following are mentioned as privilege for the verb or accessing (V) to the object (O) described herein.

(1) right to read out file
(2) right to write in file (update)
(3) right to create file anew
(4) right to delete file
(5) right to retrieve file
(6) right to change file attribute of file's name or the like Allowing unrestricted access privileges to all users will incur the danger of stalking with a bad use and abuse of files such as the arbitrary duplication, tampering or deletion thereof. As a result, a given user suffers an unexpected disadvantage and undergoes mortal damage in some cases. Unsuitable control or management of the access privileges will bring about even a breakdown of the distributed computing environment.

The concept of "access control matrix" has been known for long to those skilled in the art as the method for managing the access privileges to each object. As represented in "Table 1" shown below, the access control matrix is described in a table format, which represents, at a glance, whom (Subject) access privileges (Verb) corresponding to what extent, to respective objects (Object) such as files, are given.

TABLE 1

| | Privilege information (capability) held by Alex | | | |
|---|---|---|---|---|
| | #FILE1 | #FILE2 | #FILE3 | ... |
| Alex | Read/Write | Read | | |
| Bob | Read | Read/Write | | |
| Cod | | | | |
| . | . | . | . | . |
| . | . | . | . | . |
| . | . | . | . | . |
| | Access control list (ACL) for #FILE | | | |

In an example shown in "Table 1", accessing or access operation for reading (Read) and writing (Write) "File#1" as an object is allowed for, for example, a subject called "Alex", i.e., a user account. However, only reading is allowed for "File#2", and . . . is given to a subject of "Bob".

Information obtained by cutting out the access control matrix for every column corresponds to information descriptive of operation privilege allowed for respective subjects or users by objects, which is called "Access Control List: ACL". In the example shown in "Table 1", for example, the column corresponding to "File#1" is an access control list indicative of operation privilege given to Alex, Bob and Cod for the objects, respectively. "Unix", widely used as an operation system (OS) for a server or development platform, makes use of a simplified access control list.

Further, ones obtained by cutting out the access control matrix for every row correspond to information descriptive of operation privilege allowed for respective objects by subjects, i.e., users, which is called "privilege information" or "capability (Capability)". For example, a first row of the access control matrix shown in "Table 1" corresponds to the capability related to the user "Alex". Further, a second row corresponds to the capability related to the user "Bob".

The capability has a role of a sort of key for allowing an access to each object. Namely, the access to each object is permitted for a subject or user having a capability. The capability is described in a URL (Uniform Resource Locator) character string over a network (e.g., Internet) wherein, for example, an infinite number of hosts are TCP/IP (Transmission Control Protocol/Internet Protocol)-connected, and may be exchanged between the hosts as an HTTP (Hyper Text Transfer Protocol) message.

Owing to the delivery of the capability from Alex to Cod, for example, Cod is capable of holding operation privilege similar to Alex with respect to each object. Cod having taken over the capability obtains access to each object as a representative of Alex even in the absence of Alex and is capable of acting for Alex's duty.

However, if the capability is transferred or lent and given without any restriction, there is a possibility that an unexpected disadvantage will occur due to the bad use and abuse of the capability. Therefore, the capability transferor may preferably deliver the capability in the form of weakened privilege contents as in the case of addition of an expiration date or the number of permissions for use to the capability, a limitation of operation privilege to each object (e.g., a limitation of a full access to only reading), etc.

When a subject having obtained the capability by transfer delivers the contents thereof in such a format as to be interpretable with ease, a transferee or assignee would be in danger of tampering with the contents of the capability to thereby strengthen privilege freely, and duplicating the capability without permission to thereby access each object without any restriction. Further, a third party who intercepts the transmission of the capability, is also able to operate each object illegally in a manner similar to above.

If the above is described collectively, then the safe transfer of the capability between the respective hosts on the network becomes an important technical problem in terms of the protection of each object.

As to access control on each object, several techniques have already been proposed.

For example, Japanese Published Unexamined Patent Application No. Hei 5-81204 discloses access control in a distributed computer system. According to the same publication, there is provided a method capable of controlling a substitute use of a privilege attribute certificate (PAC) equivalent to a capability and simultaneously using the PAC for many purposes. Namely, when the PAC is distributed, a starter qualification attribute corresponding to a starter subject is included therein and an encryption key having the starter qualification attribute on an encrypted basis is distributed to the starter subject.

However, according to the method disclosed in Japanese Published Unexamined Patent Application No. Hei 5-81204, it cannot cope with variations in capability such as an expiration date of use and the number of accesses. Further, no method of freely creating a PAC weakened in capability by the starter subject is disclosed.

On the other hand, Japanese Published Unexamined Patent Application No. Hei 9-319659 discloses a method for assigning different capabilities to respective users in a non-distributed computer system. According to the same publication, the entire computer function is subdivided into event sets each having a capability set. Further, the capability is given according to a specific job to be executed by each user on the computer system.

However, the invention according to Japanese Published Unexamined Patent Application No. Hei 9-319659 is not one applied to a distributed environment under which the capability cannot be protected in safety. Further, the same publication refers to no method of safely inspecting capabilities between objects.

Further, Japanese Published Unexamined Patent Application No. Hei 9-251425 discloses security control on an access to a system resource in a distributed system.

According to the security control system disclosed in the same publication, a group identifying mark is stored and joined to a target object. It is next judged using a membership test whether a client who makes an access request to a target object, is a group member having access privileges to a target.

However, Japanese Published Unexamined Patent Application No. Hei 9-251425 does not disclose a method for handling or coping with variations in capability such as an expiration date of use and the number of accesses. Further, the present publication does not refer to a method for generating a capability anew by a capability holder and invalidating the generated capability.

Further, the "Amoeba" known to those skilled in the art as a distributed OS (Operating System) provides capabilities capable of transfer and difficult to forge. This is implemented by the following mechanisms.

(1) A client transmits an object generation request to a server.

(2) The server generates objects and assigns object numbers and random numbers thereto respectively. The random numbers are stored in object tables indexed with the object numbers.

(3) The server generates a capability including a check field in which privilege and random numbers are encrypted with the random numbers as keys.

(4) The capability is returned to the client.

(5) The client issues an access request indicative of the capability to the server.

(6) The server extracts the corresponding object number and check field from the capability and decrypts the corresponding privilege and random number from the check field, based on the random numbers stored in the object tables.

(7) It is verified whether the random number obtained from the result of decrypting coincides with the random numbers stored in the object tables.

(8) If the required operation matches with the privilege described in the capability, then the server executes the operation.

The Amoeba is also provided with the following mechanisms to allow the capability holder to generate anew capability weakened in privilege.

(1) Each of clients and a server share the use of N commutative one-way functions.

(2) The client generates second privilege.

(3) The client applies all the one-way functions associated with numbers each corresponding to privilege equivalent to the difference between first privilege and the second privilege to thereby generate a second check field.

(4) The server receives a capability including the second privilege and second check field.

(5) The server successively applies the one-way functions in accordance with a privilege field. When each one-way function coincides with the check field offered by the client, the server executes its operation.

However, the Amoeba defines the method of describing the propriety of N pieces of privilege by using the N commutative one-way functions but does not take into consideration points corresponding to many variations about privilege such as usage privilege and the number of privilege uses. As to capability's invalidation, the Amoeba defines the method of invalidating all the capabilities about a given object by changing the random numbers held by the server but does not refer to a method of invalidating the specific capability. The Amoeba does not define invalidation of only a capability generated by a given capability holder and a capability derived therefrom at all. In the Amoeba, the object number itself for accessing each object is not protected at all.

A paper of Bjorn N. Freeman-Benson open to the public on a Web, "Using the Web to Private Information—or—A Short Paper About Password Protection Without Client Modification" discloses the handling of a confidential URL (i.e., capability). A method described in the same paper follows a procedure shown below.

(1) A server generates and holds a password list including pairs of log-in names and passwords. Further, the server holds an encryption key.

(2) A client transmits a message including a pair of a log-in name and a password to the server.

(3) The server retrieves the password list. If the corresponding pair of the log-in name and password transmitted from the client is found, then the server transmits a character string obtained by encrypting the log-in name and password with the encryption key to the client as an access key inclusive of it in an URL.

(4) The client makes an access request to the server using the received URL.

(5) The server extracts the access key from the received URL and decrypts it by using the encryption key to thereby obtain the pair of the original log-in name and password. Further, the server checks to see whether it is registered in the password list.

(6) If it is found to have been registered in the password list, then the server permits an access to the corresponding object.

Further, the same paper refers to the point that the client makes a change in password to thereby allow invalidation of the URL.

However, the same paper does not disclose the point that plural URLs (i.e., capabilities) legitimate and different from one another for a given object are generated.

If the above is summed up, then the prior art has the following problems:

(1) It is difficult to safely manage and transfer capabilities in association with variations diversified in privilege contents such as the expiration date of usage and the number of valid uses.

(2) It is difficult to invalidate only some of capabilities without invalidating all the capabilities related to the corresponding object.

(3) A subject having a capability is not able to freely generate a capability changed (weakened) in the contents of privilege held by the capability and safely manage and transfer it or invalidate it.

SUMMARY

The present invention provides an excellent access privilege transferring method capable of safely transmitting "capability" descriptive of access privileges related to each object between subjects (users) over an object space in which service objects are scattered.

The present invention also provides an excellent access privilege transferring method capable of safely transmitting "capability" descriptive of access privileges about each object between hosts (users) under a distributed computing environment wherein the plural hosts are connected to one another by a network and objects are scattered over the network.

Further, the present invention provides an excellent access privilege transferring method wherein subjects each holding a capability are capable of freely generating capabilities changed in privilege contents and they can safely transfer the same to other subjects.

Furthermore, the present invention provides an excellent access privilege transferring method wherein subjects each holding a capability are capable of freely generating capabilities changed in privilege contents and managers of objects can safely check the generated capabilities.

The present invention has been made in view of the foregoing problems. According to a first aspect of the present invention, an access privilege transferring method for safely transferring access privileges between respective clients and between the clients and servers under a computing environment in which at least one server for providing objects and at least one client for requiring the objects are connected to one another by a network and accessing to each of the objects complying with privilege information held by each of the clients is allowed, includes the steps of:

(a) causing each of the clients to hold user information and secret information;

(b) causing the server to hold the user information and secret information of each of the clients;

(c) causing the client to generate privilege information;

(d) causing the client to apply a predetermined calculating operation to information including at least privilege information and secret information, thereby generating protected privilege information;

(e) causing the client to transmit the user information, privilege information and protected privilege information to another client;

(f) causing another client to transmit the user information, privilege information and protected privilege information to the server, thereby making a request to access each object;

(g) causing the server to check to see whether the privilege information received in Step (f) is valid;

(h) causing the server to apply a predetermined calculating operation to information including at least privilege information and secret information, thereby generating protected privilege information;

(i) causing the server to compare the protected privilege information received in Step (f) with the protected privilege information generated in Step (h); and (j) allowing an access to each object in response to the coincidence of the two as a result of the comparison in Step (i)

According to a second aspect of the present invention, an access privilege transferring method for safely transferring access privileges between respective clients and between the clients and servers over an object space in which at least one server for providing objects and at least one client for requiring the objects are connected to one another by a network and accessing to each of the objects complying with privilege information held by each of the clients is allowed, includes the steps of:

(A) causing each of the clients to hold user information and secret information;

(B) causing the server to hold the user information and secret information of each of the clients;

(C) causing the client to generate privilege information;

(D) causing the client to apply a predetermined calculating operation to information including at least privilege information and secret information, thereby generating first protected privilege information;

(E) causing the client to transmit the user information, privilege information and first protected privilege information to another client;

(F) causing the other client to receive a challenge character string from the server;

(G) causing the other client to apply a predetermined calculating operation to information including at least the challenge character string and first protected privilege information, thereby generating second protected privilege information;

(H) causing the other client to transmit the user information, privilege information and second protected privilege information to the server, thereby making a request to access each object;

(I) causing the server to check to see whether the privilege information received in Step (H) is valid;

(J) causing the server to apply a predetermined calculating operation to information including at least privilege information and secret information, thereby generating first protected privilege information;

(K) causing the server to apply a predetermined calculating operation to information including at least a challenge character string and the first protected privilege information generated in Step (J), thereby generating second protected privilege information;

(L) causing the server to compare the second protected privilege information received in Step (H) with the second protected privilege information generated in Step (K); and (M) allowing an access to each object in response to the coincidence of the two as a result of the comparison in Step (N).

According to a third aspect of the present invention, an access privilege transferring method for safely transferring access privileges between respective clients and between the clients and servers over an object space in which at least one server for providing objects and at least one client for requiring the objects are connected to one another by a network and accessing to each of the objects complying with privilege information held by each of the clients is allowed, includes the steps:

(a) causing each of the clients to hold user information and secret information;

(b) causing the server to hold the user information and secret information of each of the clients;

(c) causing the client to generate privilege information;

(d) causing the client to encrypt privilege information by using the secret information, thereby generating protected privilege information;

(e) causing the client to transmit the user information and protected privilege information to another client;

(f) causing another client to transmit the user information and protected privilege information to the server, thereby making a request to access each object;

(g) causing the server to decrypt the protected privilege information by using secret information corresponding to the user information, thereby generating privilege information;

(h) causing the server to check to see whether the privilege information generated in Step (g) is valid; and (i) allowing an access to each object in accordance with the result of check for validity in Step (h).

According to a fourth aspect of the present invention, an access privilege transferring method for safely transferring access privileges between respective clients and between the clients and servers over an object space in which at least one server for providing objects and at least one client for requiring the objects are connected to one another by a network and accessing to each of the objects complying with privilege information held by the client is allowed, includes the steps:

(A) causing each of the clients to hold user information and secret information;

(B) causing the server to hold the user information and secret information of each of the clients;

(C) causing the client to generate privilege information;

(D) causing the client to encrypt privilege information by using the secret information, thereby generating first protected privilege information;

(E) causing the client to transmit the user information, privilege information and first protected privilege information to another client;

(F) causing the other client to receive a challenge character string from the server;

(G) causing the other client to encrypt the challenge character string by using the first protected privilege information, thereby generating second protected privilege information;

(H) causing the other client to transmit the user information, privilege information and second protected privilege information to the server, thereby making a request to access each object;

(I) causing the server to check to see whether the privilege information received in Step (H) is valid;

(J) causing the server to encrypt privilege information by using secret information, thereby generating first protected privilege information;

(K) causing the server to encrypt a challenge character string by using the first protected privilege information generated in Step (J), thereby generating second protected privilege information;

(L) causing the server to compare the second protected privilege information received in Step (H) with the second protected privilege information generated in Step (K); and (M) allowing an access to each object in response to the coincidence of the two as a result of the comparison in Step (N).

According to a fifth aspect of the present invention, an information managing method for safely managing secret information between respective clients and/or between the clients and servers over an object space in which at least one server for providing objects and at least one client for requiring the objects are connected to one another by a network, includes the steps of:

causing a first client to transmit secret information to a second client;

causing the first client to transmit an encryption key to the second client; and causing the second client to encrypt the secret information by using the encryption key, thereafter storing the encrypted secret information in a secondary memory device.

According to a sixth aspect of the present invention, an information managing method for safely managing secret information between respective clients and/or between the clients and servers over an object space in which at least one server for providing objects and at least one client for requiring the objects are connected to one another by a network, includes the steps of:

causing a first client to encrypt the secret information by using an encryption key, thereby generating protected secret information;

causing the first client to transmit the protected secret information to a second client;

causing the second client to store the protected secret information in a secondary memory device;

causing the first client to transmit a decryption key for decrypting the information encrypted by the encryption key to the second client; and causing the second client to decrypt protected secret information by using the decryption key, thereby obtaining secret information.

In the information managing method according to the sixth aspect of the present invention, the encryption key and the decryption key may be the same key, i.e., a key employed in "symmetric key cryptosystem". Alternatively, information encrypted by an encryption key (private key) may be a combination of keys employed in "public key cryptosystem" wherein decrypting can be implemented by a decryption key (public key) alone.

According to a seventh aspect of the present invention, an information managing method for safely managing secret information between respective clients and/or between the clients and servers over an object space in which at least one server for providing objects and at least one client for requiring the objects are connected to one another by a network, includes the steps of:

causing a first client to transmit secret information to a second client;

causing the second client to hold an encryption key for encrypting information and a decryption key for decrypting the encrypted information encrypted by the encryption key;

causing the second client to transmit the decryption key to the first client;

causing the second client to store protected secret information obtained by encrypting the secret information with the encryption key in a secondary memory device; and causing the second client to decrypt the protected secret information by using the decryption key, thereby obtaining the secret information.

According to an eighth aspect of the present invention, an information managing method for safely managing secret information between respective clients and/or between the clients and servers over an object space in which at least one server for providing objects and at least one client for requiring the objects are connected to one another by a network, includes the steps of:

causing a first client to transmit first secret information to a second client;

causing the second client to transmit a challenge character string to the first client;

causing the first client to apply a predetermined calculating operation to the challenge character string and second secret information, thereby generating an encryption key;

causing the first client to transmit the encryption key to the second client; and causing the second client to store protected secret information obtained by encrypting the secret information by using the encryption key in a secondary memory device.

The present invention is applied to such a distributed computing environment as employed in a LAN (Local Area Network) or an Internet. Under such a distributed computing environment, one or more servers for providing or offering objects and one or more clients for requiring the objects are connected to one another by a network, whereby a so-called "object space" is formed. One example of the object space is a WWW (World Wide Web) information space, which is developed under a distributed computing environment wherein respective hosts are TCP/IP (Transmission Control Protocol/Internet Protocol)-connected, and in which HTTP (Hyper Text Transfer Protocol) objects described in an HTML (Hyper Text Markup Language) format are provided.

On such an object space, access rights or privileges to the object of each client is described in a format of "right or privilege information" or "capability". Accordingly, individual clients basically provide a server for managing and offering the objects with their own user information and privilege information assigned thereto to thereby get permission to access to the objects.

Further, another client having taken over privilege information from each client presents user information and privilege information about the original client to thereby get permission to access to each object. However, when the privilege information is transferred without any restriction, each client corresponding to a transferor might suffer an unexpected disadvantage due to a bad use or abuse of the privilege information, or unauthorized duplication or tampering of the privilege information because of the abuse or insufficient safe management of the privilege information by a transferee.

Therefore, the privilege information transferor may preferably transfer privilege information (e.g., privilege information to which the period of validity, the number of permissions for use, etc., are added or in which an object's operation privilege or right is restricted) weakened in right or privilege contents with a view toward eliminating an unlimited access to each object. Further, countermeasures are required to be taken so as to allow safe transmission of the privilege information with a view toward avoiding arbitrary tampering of the privilege information (e.g., arbitrary rewriting of the period of validity and strengthening of an operation privilege or right) after the transfer of the privilege information.

The present invention is based on the assumption that user information and secret or private information of each client are shared between respective clients and a server. The private information indicates a password or the like and can be used as a private key at the time that an encryption function is applied to predetermined information, for example.

According to the first aspect of the present invention, each client for transferring privilege information generates privilege information weakened in its own privilege contents and applies a predetermined calculating operation to a bit string obtained by concatenating the generated privilege information and private or secret information, thereby making it possible to generate protected privilege information having eliminated the danger of its bad use such as tampering.

One example of the predetermined calculating operation described herein is a "one-way function". The one-way function is a function so difficult to determine its inverse function and has the feature of making it impossible to estimate the value of an argument preceding the application of the function thereto. Thus, third parties who do not know the private information, are not able to freely tamper with the protected privilege information.

The client transmits its own user information, newly-generated privilege information and protected privilege information to another client to which the client desires to transfer access privileges. Another client is able to make an access request to each object for a server with the transferred user information, privilege information and protected privilege information attached thereto.

On the one hand, the server first checks to see whether the privilege information is valid, i.e., the operation of making the request to each object by the client falls within a range allowable with the privilege information. If the result of check is found to be negative, then the corresponding access request is rejected as an unauthorized access.

Next, the server applies a predetermined calculating operation, e.g., a one-way function to a bit string obtained by concatenating user information and private or secret information received through an access request message to thereby regenerate protected privilege information. Further, the regenerated protected privilege information is compared and collated with the protected privilege information received through the access request message. It is thus possible to safely check to see whether an access request client has an authorized or proper privilege. If the two are found to coincide with each other, then the access request is accepted. If not so, then the access request is rejected as an unauthorized access. Namely, the server is able to safely inspect the transferred access privilege or privileges.

Further, the access privilege transferring method according to the second aspect of the present invention adopts "challenge response authentication" for encrypting information with only-once used numerals called a "challenge character string" as a base and transferring the same in order to execute an authentication process.

First, each client for transferring privilege information generates privilege information weakened in its own privilege contents. Further, the client applies a calculating operation such as a one-way function to a bit string obtained by concatenating the generated privilege information and private or secret information, thereby generating first protected privilege information having eliminated the danger of its bad use. Thus, no third parties who do not know the private information are able to freely tamper with the first protected privilege information.

The client transmits its own user information, newly-generated privilege information and first protected privilege information to another client to which the client desires to transfer access privileges.

The server sends a reply of a challenge character string in response to an access request issued from the client. On the other hand, the client applies a predetermined calculating operation such as a one-way function to a bit string obtained by concatenating the challenge character string and first protected privilege information to thereby generate second protected privilege information having eliminated its bad use. A third party who does not know the challenge character string, is not able to freely tamper with the second protected privilege information.

Next, the client makes an access request to each object for the server again with the transferred user information, privilege information and second protected privilege information attached thereto.

In response to the access request, the server checks to see whether the privilege information is valid, i.e., the operation of making the request to each object by the client falls within a range allowable with the privilege information. If the result of check is found to be negative, then the corresponding access request is rejected as an unauthorized access.

Next, the server applies a predetermined calculating operation such as a one-way function to a bit string obtained by concatenating user information and private or secret information received through an access request message to thereby regenerate first protected privilege information. Further, the server applies the predetermined calculating operation such as the one-way function to a bit string obtained by concatenating a challenge character string and first protected privilege information to thereby regenerate second protected privilege information. The regenerated second protected privilege information is compared and collated with the second protected privilege information received through the access request message. It is thus possible to safely make a decision as to whether an access request client has an authorized or proper privilege. If the two are found to coincide with each other, then the access request is accepted. If not so, then the access request is rejected as an unauthorized access. Namely, the server is able to safely inspect the transferred access privileges.

Further, the access privilege transferring method according to the third aspect of the present invention is one wherein an encryption function is used as a predetermined calculating operation for protecting privilege information to be transferred, without using a one-way function. Secret or private information shared between each client and a server can be used as an encryption key for the encryption function. Both of a symmetric private key cryptosystem and a public key cryptosystem can be applied as a cryptosystem. The symmetric private key cryptosystem is a system wherein the same private key is shared between communication partners or objects and capable of decrypting encrypted information by using the same key as the private key used for encryption. In contrast to it, the public key cryptosystem is a system wherein information is encrypted and decrypted by a combination of two keys having such properties that information encrypted by one key can be decrypted by the other key alone. It is common that one key is held by a user individual as a "private key" held in secrecy and the other key is used as a "public key" open to the public for the third parties. Encrypting information with the public key, for example, makes it possible to safely transmit a secret or private document to a private-key's owner. Owing to the transmission of a signature encrypted using the private key, a receiver can authenticate the signature through the use of the public key.

First, each client that transfers privilege information, generates privilege information weakened in its own privilege contents. Next, the client encrypts the privilege information by using private or secret information to thereby generate protected privilege information having eliminated the danger of its bad use. Accordingly, none of third parties who do not know the private information is able to freely tamper with the protected privilege information.

The client transmits its own user information and protected privilege information to another client to which the client desires to transfer access privileges. Another client makes an access request to each object for a server with the transferred user information and protected privilege information attached thereto.

On the one hand, the server first decrypts the protected privilege information by using the private or secret information corresponding to the user information to thereby generate privilege information.

Next, the server checks to see whether the privilege information is valid, i.e., the operation of making the request to each object by the client falls within a range allowable with the privilege information. If the result of check is found to be negative, then the corresponding access request is rejected as an unauthorized access. Namely, the server is able to inspect the transferred access privileges in safety.

Further, the access privilege transferring method according to the fourth aspect of the present invention is one wherein "challenge response authentication" for encrypting information with only-once used numerals called a "challenge character string" as a base and transferring the same is applied to the third aspect. The "challenge response authentication" is a sort of "zero knowledge proof" (described above).

First, each client that transfers privilege information, generates privilege information weakened in its own privilege contents. Further, the client encrypts the privilege information by using private or secret information to thereby generate first protected privilege information having eliminated the danger of its bad use. None of third parties who do not know the private information is able to freely tamper with the first protected privilege information.

The client transmits its own user information, newly-generated privilege information and first protected privilege information to another client to which the client desires to transfer access privileges.

The server sends a reply of a challenge character string in response to an access request issued from the client. On the other hand, the client encrypts the challenge character string by using the first protected privilege information to thereby generate second protected privilege information having eliminated the danger of its bad use. A third party who does not know the challenge character string, is not able to freely tamper with the second protected privilege information.

Next, the client makes an access request to each object for the server again with the transferred user information, privilege information and second protected privilege information attached thereto.

In response to the access request, the server checks to see whether the privilege information is valid, i.e., the operation of making the request to each object by the client falls within a range allowable with the privilege information. If the result of check is found to be negative, then the corresponding access request is rejected as an unauthorized access.

Next, the server encrypts privilege information by using private or secret information to thereby regenerate first protected privilege information. Further, the server encrypts a challenge character string by using the regenerated first protected privilege information to thereby regenerate second protected privilege information. The regenerated second protected privilege information is compared and collated with second protected privilege information received through an access request message. It is thus possible to safely make a decision as to whether an access request client has an authorized or proper privilege. If the two are found to coincide with each other, then the access request is accepted. If not so, then the access request is rejected as an unauthorized access. Namely, the server is able to safely inspect the transferred access privileges.

According to the access privilege transferring methods according to the first through fourth aspects of the present invention as described above, clients are respectively able to safely access privileges to other clients by transmitting protected privilege information having eliminated the danger of their bad use. However, when other clients to which the access privileges have been transferred, vulnerably store the protected privilege information into a secondary memory device like a hard disk, there is a danger of making an attack against and an unauthorized access to the hard disk by a third party to thereby cause leakage of the protected privilege information itself. It becomes difficult to avoid the unauthorized access using the protected privilege information by the third party as a result of its leakage.

The information managing methods according to the fifth through eighth aspects of the present invention have been made in view of such technical problems. The present invention provides a method of safely storing information high in privacy such as protected privilege information into a secondary memory device.

Further, other objects, features and advantages of the present invention will become apparent from more detailed descriptions based on embodiments of the present invention to be described later and the accompanying drawings.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF EMBODIMENTS

Figure 1:
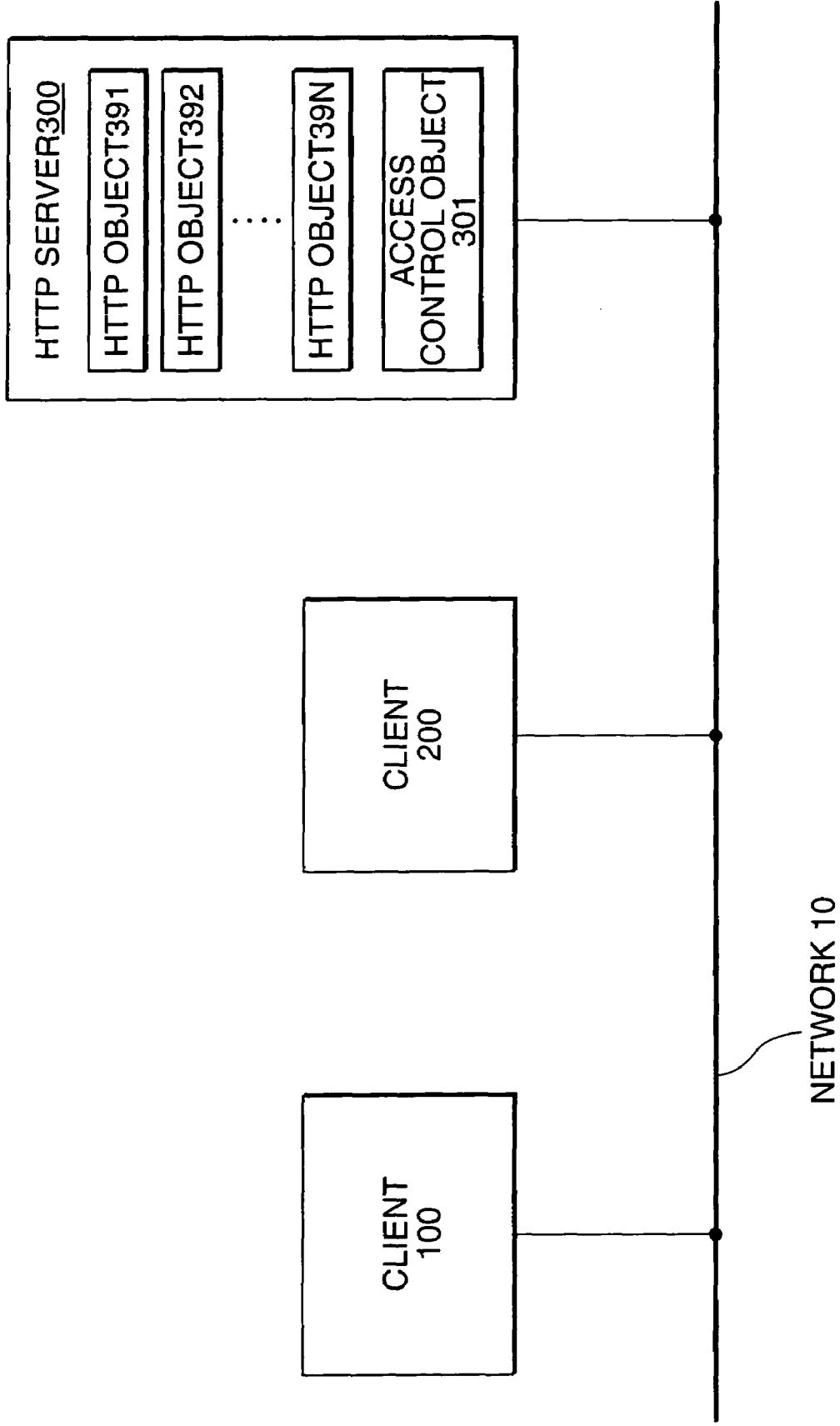
FIG. 1 is a diagram typically showing a distributed computing environment according to embodiments of the present invention.

The present invention is applied to such a distributed computing environment as employed in a LAN (Local Area Network) or an Internet. Respective computer systems on a network, i.e., "hosts" are connected to one another in accordance with a predetermined communication protocol like a TCP/IP (Transmission Control Protocol/Internet Protocol).

Under such a distributed computing environment, one or more service objects for providing or offering objects and one or more clients for requiring the objects are connected to one another by a network, whereby a so-called "space" is formed. In a wide area information providing system WWW (World Wide Web) open to the public over a Internet, for example, hyper text objects described in an HTML (Hyper Text Markup Language) format are provided in accordance with an HTTP (Hyper Text Transfer Protocol) protocol.

Individual objects are respectively specified uniquely over the object space according to a character string represented in a predetermined format, called a URL (Uniform Resource Locator). The URL indicates a character string for specifying the designation of a resource and the location of existence thereof over a resource space such as a network and is described (already known) in formats of a scheme name (protocol name): //host name (domain name): port number/ path name (file name). Each of clients is able to make a request for an access (i.e., operation for each object) to each object to an HTTP server by transmitting an HTTP message including a URL about a desired HTTP object.

On such an object space, access rights or privileges to the HTTP object of each client is described in a format of "right or privilege information" or "capability". Individual clients basically provide a server, i.e., a service object with their own user information and privilege information assigned thereto to thereby get permission to access to the objects. In the HTTP protocol, the capability is described in the URL character string and also allowed even for the exchange thereof between hosts as the HTTP message.

Further, the client is able to transfer the access privileges to the object to another client in the format that the URL including the privilege information is delivered to another client. However, as already described in the paragraph of "Related Art", the client corresponding to a transferor suffers an unexpected disadvantage due to a bad use or abuse of the privilege information, unauthorized duplication or tampering of the privilege information when the privilege information is transferred to another client without limitation.

In respective embodiments according to the present invention as will be described below, right or privilege transferors are supposed to have transferred privilege information weakened in right or privilege contents (such as privilege information to which the period of validity, the number of permissions for use, etc., are added or in which an object's operation privilege or right is weakened) with a view toward eliminating an unauthorized access to an object. Further, countermeasures have been taken so as to allow safe transmission of the privilege information with a view toward avoiding arbitrary tampering of the privilege information (e.g., arbitrary rewriting of the period of validity and strengthening of an operation privilege or right) after the completion of their transfer.

1. First Embodiment

FIG. 1 typically shows a distributed computing environment according to the first embodiment of the present invention. The first embodiment is one for applying a one-way function MD (Message Digest) to privilege information to thereby implement safe transfer of an access privilege or right. Respective parts will be described below.

An infinite number of hosts are TCP/IP-connected to one another over a network 10 like an Internet. Some of the hosts are an HTTP server 300 for providing HTTP objects, ..., and some others thereof are clients 100, 200, ... for respectively making requests for accesses to the objects to a server. Incidentally, the substance of the server is a general purpose computer for operating an HTTP server application. Further, each of clients is a general purpose computer for operating client applications such as a WWW browser, etc.

In the example shown in FIG. 1, the HTTP server 300 will be represented by a URL given as "hyperlink http://www300". Further, the HTTP server 300 has an access control object 301, and N HTTP objects designated at reference numerals 391 through 39N. The respective HTTP objects 391 through 39N will be indicated by URLs given as "hyperlink http://www300/object391, ..., http://www300/object39N", respectively. Further, the access control object 301 is an object for controlling an access request to each of the HTTP objects 391 through 39N. However, the access control object 301 does not necessarily require the existence thereof over the same server as that for the HTTP objects 391 through 39N. The access control object 301 exists over another host (not shown), for example and may be invoked or called up from the HTTP server 300 on a remote basis so as to start up a predetermined access control process.

Each of the clients 100 ... has user information capable of identifying a user and a password used as secret information. Let's suppose that the client 100 has user information "userid1" and a password "password1" in the example illustrated in FIG. 1.

The access control object 301 of the HTTP server 300 stores therein combinations (userid1, password1), (userid2, password2), ... of the user information about the respective clients 100 ... and their passwords as a "password management table" (tentative name).

In the present embodiment, the exchange of HTTP messages will be carried out in accordance with a Basic Authentication Scheme (BAS) of HTTP1.1. Namely, the client 100 is able to issue the following HTTP request to thereby start up a GET method of the HTTP object 391.

GET/object391HTTP/1.1

Authorization: Basic authdata     [Expression 1]

where, "authdata" indicates a character string obtained by encoding a bit string userid1:password1 formed by concatenating user information and passwords with one another in accordance with a line feed-free base64 encode method. Incidentally, the "base64" described herein is a system for coding an attached file such as an electronic mail, utilizing MIME (Multipurpose Internet Mail Extensions) and converts a character string or an attached file into ASCII (American Standard Code for Information Interchange) codes such as 64 alphabets or numbers in all.

Next, an access privilege or right transferring method according to the present embodiment will be described with the transfer of privilege information from the client 100 to the client 200 as an example.

The privilege information has a character string including the following respective matters or items (however, they are merely illustrated by way of example and other matters such as the number of permissions for use, etc., may be included in the privilege information).

string of object's names string of method's names the date of commencement of the period of validity and the date of end of the period of validity Now consider where the client 100 has generated the following privilege information character string capability1 to transfer access rights or privileges to the client 200.

(((/object391),(GET),Apr:24:10:00:48:1999:GMT,

Apr:25:10:00:48:1999:GMT)     [Expression 2]

The privilege information character string indicates a right to allow the execution of only a GET method with respect to the HTTP object 391 represented by "/object391" only during a period of from 0 minute 48 seconds past ten, Apr., 24 in 1999 at GMT to 0 minute 48 seconds past ten, Apr. 25 in 1999 at GMT.

In the present embodiment, the client 200 will handle only names in the server as the object's names because it is intended for only the HTTP server 300. However, the client 200 may identify objects of plural HTTP servers by using global identifiers such as URL as the object's names.

Next the client 100 bit-concatenates the password1 used as the secret information with the privilege information capability1 from behind the character string and applies the one-way function MD thereto, thereby generating protected right or privilege information capabilityMD1 shown below.

MD(((/object391),(GET),Apr:24:10:00:48:1999:GMT,

Apr:25:10:00:48:1999:GMT)+password1)     [Expression 3]

The one-way function MD is a function so difficult to determine its inverse function and has the feature of making it impossible to estimate the value of an argument preceding the application of the function MD thereto. Thus, third parties who do not know the secret information password1 are not able to freely tamper with the protected privilege information capabilityMD1.

Next, the client 100 transmits information including at least the following to another client 200.

userid1 (user information)
capability1 (privilege information) and
capabilityMD1 (protected privilege information)

As already described above, the third parties (including the client 200) who do not know the secret information password1, are not able to tamper with the protected privilege information capabilityMD1. It is thus understood that the client 100 is able to safely transfer access rights or privileges to the HTTP object 391 to another client 200.

On the other hand, the client 200 having received the information referred to above provides a service for obtaining access to the HTTP object 391 as an representative of the client 100.

The client 200 transmits a request message including at least the following information to the HTTP server 300 to access the HTTP object 391.

object's name
method's name
user's name
privilege information and
message digest of privilege information In the present embodiment, such a request message as shown below is transmitted.

GET/object391HTTP/1.1

Authorization: Capability cap1            [Expression 4]

Now, a character string cap1 will be defined as a character string obtained by coupling the user's name, the privilege information and the message digest of the privilege information to one another by using ":" and encoding it by the line feed-free base64 encode method (described above).

Figure 2:
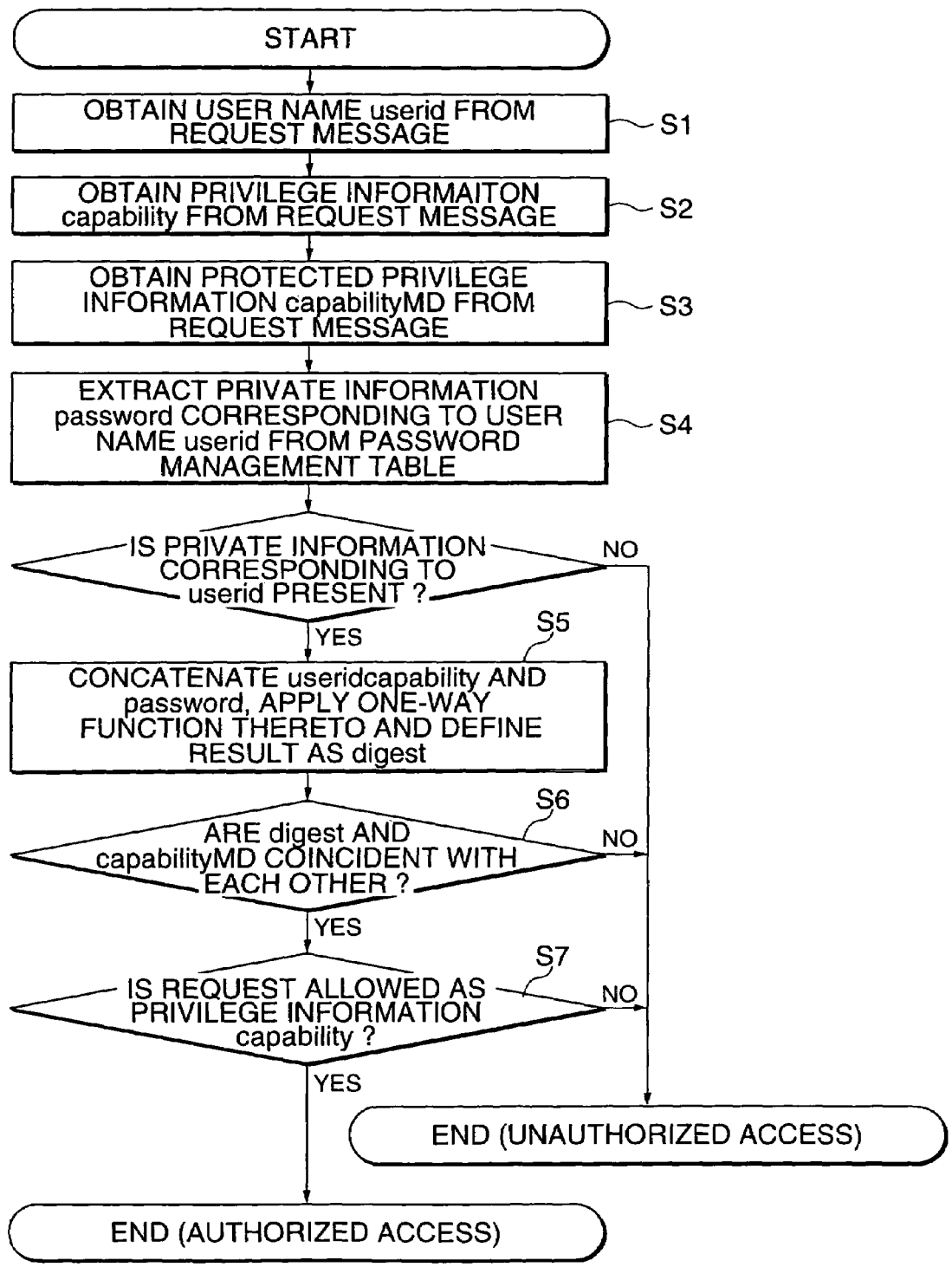
FIG. 2 is a flowchart illustrating a procedure for allowing an access control object 301 to determine legitimacy of an access, which is employed in a first embodiment of the present invention.

The access control object 301 of the HTTP server 300 takes out the following information from an Authorization field lying in the request message.

user information
privilege information and
message digest of privilege information Further, the access control object 301 executes the following algorithm1 (see FIG. 2), based on these taken-out pieces of information, thereby making it possible to make a decision as to whether the client 200 is a person to which the access privileges to the HTTP object 391 have been legitimately transferred.

Algorithm 1:

(Step 1) The user's name extracted from the Authorization field is defined as userid.

(Step 2) The privilege information extracted from the Authorization field is defined as capability.

(Step 3) The message digest of the privilege information extracted from the Authorization field is defined as capabilityMD.

(Step 4) A password corresponding to the userid is obtained from a password management table. The password obtained from the password management table is defined as password. On the other hand, when the corresponding password is not registered therein, a request message issued from the client 200 is regarded as an unauthorized access and the present algorithm is terminated.

(Step 5) The privilege information capability and the private or secret information password are bit-coupled to each other and the one-way function MD is applied to the bit-coupled one. The result thereof is defined as digest.

(Step 6) The digest is compared with the capabilityMD included in the request message. When the two are not equal to each other, the request message issued from the client 200 is regarded as an unauthorized access and the present algorithm is terminated. When they coincide with each other, the access control object 301 proceeds to the next Step.

(Step 7) The access control object 301 checks for privilege's validity of a method (i.e., the contents of processing for each object), an object to be taken, an expiration date, etc., required by the client 200, based on the capability extracted from the Authorization field. If the request is one unauthorized or unallowed as capability, it is then judged as an unauthorized access and the present algorithm is terminated. If the request falls within an allowable range, it is then judged as an authorized access and the present algorithm is completed.

When the request message is found to be the authorized access as a result of execution of the algorithm1, the access control object 301 transmits a message for starting up the GET method to the HTTP object 391.

Figure 3:
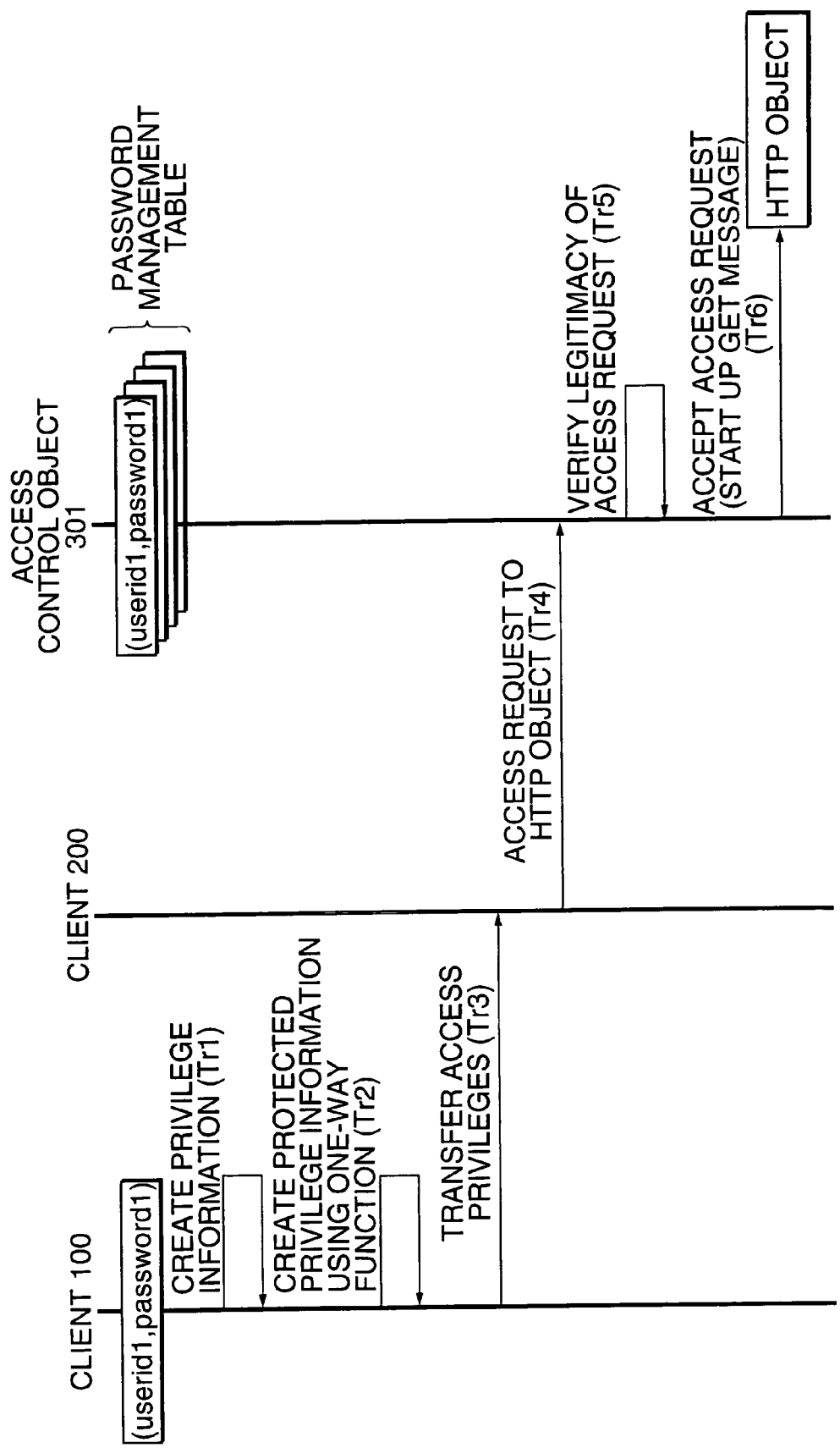
FIG. 3 illustrates transactions executed among a client 100, a client 200 and an HTTP server 300, which are employed in the first embodiment of the present invention.

FIG. 3 illustrates transactions executed among the client 100, client 200 and HTTP server 300 employed in the present embodiment. They will be described below with reference to the same drawing.

Assume that as a premise of the transactions, the client 100 holds therein its user information "userid1" and password "password1" as an account (qualifications for a user) for an access to the HTTP server 300. Further, the access control object 301 of the HTTP server 300 stores therein the combinations (userid1, passwords), (userid2, password2), . . . of the user information about the respective clients 100 . . . and their passwords as the "password management table".

The client 100 creates privilege information capability1 which may be given to the client 200 as to an access to the HTTP object 391 (Tr1).

Next, the client 100 applies the one-way function MD to a bit string obtained by bit-concatenating its own secret information passwords with the rear of the privilege information capability1 to thereby generate protected privilege information capabilityMD1 (Tr2).

Next, the client 100 transmits the user information userid1, the privilege information capability1 and the protected privilege information capabilityMD1 to the client 200 to thereby safely transfer access privileges thereto (Tr3).

The client 200 to which the access privileges have been transferred transmits an access request to the HTTP object 391 to the HTTP server 300 (Tr4). The user name userid1, privilege information capability1 and protected privilege information capabilityMD1 of the client 100 are attached to the access request.

The access control object 301 of the HTTP server 300 verifies legitimacy of the access request issued from the client 200 (Tr5). This verification complies with the procedure defined by the aforementioned algorithm1 (see FIG. 2).

When the result of verification is successfully completed, the access control object 301 accepts the access request (Tr6). More specifically, the access control object 301 starts up a requested method (e.g., GET method).

2. Second Embodiment second embodiment of the present invention will next be described. The second embodiment is applicable to such a distributed computing environment as shown in FIG. 1 in the same manner as described above. The second embodiment is one in which a one-way function is applied to privilege information and "challenge response verification" for encrypting the information on the basis of numbers called "challenge character string", which are used only once and performing its swapping, is adopted.

In the present embodiment, an HTTP server 300 will be represented by a URL given as "hyperlink http://www300". Further, the HTTP server 300 has an access control object 301 and N HTTP objects designated at reference numerals 391 through 39N. The HTTP objects 391 through 39N will be respectively represented by URLs given as "hyperlink "http://www300/object391", ... , "http://www300/object39N".

The access control object 301 is an object for controlling an access request to each of the HTTP objects 391 through 39N. However, the access control object 301 does not necessarily require the existence thereof over the same server 300 as that for the HTTP objects 391 through 39N. The access control object 301 exists over another server (not shown), for example and may be invoked or called up from the HTTP server 300 on a remote basis so as to start up a predetermined access control process.

Each of clients 100 . . . has user information capable of identifying a user and a password used as secret information. Let's suppose that the client 100 has user information "userid1" and a password "password1".

The access control object 301 of the HTTP server 300 stores therein combinations (userid1, password1), (userid2, password2), . . . of the user information about the respective clients 100 . . . and their passwords as a "password management table" (tentative name).

In the present embodiment, the exchange of HTTP messages will be carried out in accordance with a Digest Authentication Scheme (Basic Authentication Method) of HTTP1.1. Namely, the client 100 is able to issue the following HTTP request to thereby start up a GET method of the HTTP object 391.

GET/object391HTTP/1.1

Authorization: Digest digest-response [Expression 5]

where "digest-response" is authentication data generated based on the provision of HTTP1.1.

Next, an access right or privilege transferring method according to the present embodiment will be described with the transfer of privilege information from the client 100 to the client 200 as an example.

The privilege information has a character string including the following respective matters or items (however, they are merely illustrated by way of example and other matters such as the number of permissions for use may be included in the privilege information).

string of object's names
    string of method's names
    the date of commencement of the period of validity and
    the date of end of the period of validity Now consider where the client 100 has generated the following privilege information character string capability1 to transfer an access privilege or right to the client 200.

((/object391),(GET),Apr:24:20:00:48:1999:GMT

Apr:25:20:00:48:1999:GMT) [Expression 6]

The privilege information character string indicates a right to allow the execution of only a GET method with respect to the HTTP object 391 represented by "/object391" only during a period of from 0 minute 48 seconds past ten, Apr., 24 in 1999 at GMT to 0 minute 48 seconds past ten, Apr. 25 in 1999 at GMT.

In the present embodiment, the client 200 handles only names in the server as the object's names because it is intended for the HTTP server 300 alone. However, the client 200 may identify objects of plural HTTP servers by using global identifiers such as URL as the object's names.

Next, the client 100 bit-concatenates the password1 used as the secret information with the privilege information capability1 from behind the character string and applies a one-way function MD thereto, thereby generating protected privilege information capabilityMD1 shown below.

MD(((/object391),(GET),Apr:24:20:00:48:1999:GMT

Apr:25:20:00:48:1999:GMT)+password1) [Expression 7]

The one-way function MD is a function so difficult to determine its inverse function and has the feature of making it impossible to estimate the value of an argument preceding the application of the function MD thereto. Thus, third parties who do not know the secret information password1, are not able to freely tamper with the protected privilege information capabilityMD1.

Next, the client 100 transmits information including at least the following to another client 200.

userid1 (user information)
    capability1 (privilege information) and
    capabilityMD1 (protected privilege information)

As already described above, the third parties (including the client 200) who do not know the secret information password1 are not able to tamper with the protected privilege information capabilityMD1. It is thus understood that the client 100 is able to safely transfer access privileges to the HTTP object 391 to another client 200.

On the other hand, the client 200 having received the information referred to above provides a service for obtaining access to the HTTP object 391 as an representative of the client 100.

The client 200 first transmits such a message as shown below to the HTTP server 300 to access the HTTP object 391.

GET/object391HTTP1.1 [Expression 8]

Since no authentication data is included in the request message in this case, the HTTP server 300 transmits the following response message to the client 200.

HTTP/1.1 401 Unauthorized

WWW-Authenticate: Capability realm="private@fujixerox.co.jp", qop="auth,auth-int", nonce="0a093dad98c11d0f600cfc7102dd2f0e8c", opaque="a9f0171e7f40e415aa951069a403ecaf" [Expression 9]

Of the above message, a character string substituted into nonce corresponds to a "challenge character string" for executing "challenge response authentication". The "challenge response authentication" is a technique for carrying out password authentication safely and indicates a system for encrypting message information on the basis of a challenge character string used one alone and performing message swapping.

The client 200 calculates a message digest of a character string obtained by bit-concatenating at least the challenge character string nonce and the protected privilege information capabilityMD1. If described in this example, an expression shown below is calculated as follows:

MD("0a093dad98c11d0f600cfc7102dd2f0e8c"+capabilityMD1) [Expression 10]

Further, other character strings may also be concatenated. The following expression may be calculated as in the case of HTTP/1.1, for example.

MD(MD(userid1": "private@fujixerox.co.jp":"capabilityMD1)+nonce":"cnonce":"qop":"MD (GET":"/object391")) [Expression 11]

The result of calculation is defined as response1. The client 200 transmits the following request message to the HTTP server 300 to obtain access to the HTTP object 391.

GET/object391HTTP/1.1

Authorization: Capability username=userid1 realm="provate@fujixerox.co.jp", nonce="0a093dad98c11d0f600cfc7102dd2f0e8c", uri="/object391", qop=auth, nc=00000001, cnonce="1bce22bf", capability=capability1, response=response1, opaque="a9f0171e7f40e415aa951069a403ecaf" [Expression 12]

Figure 4:
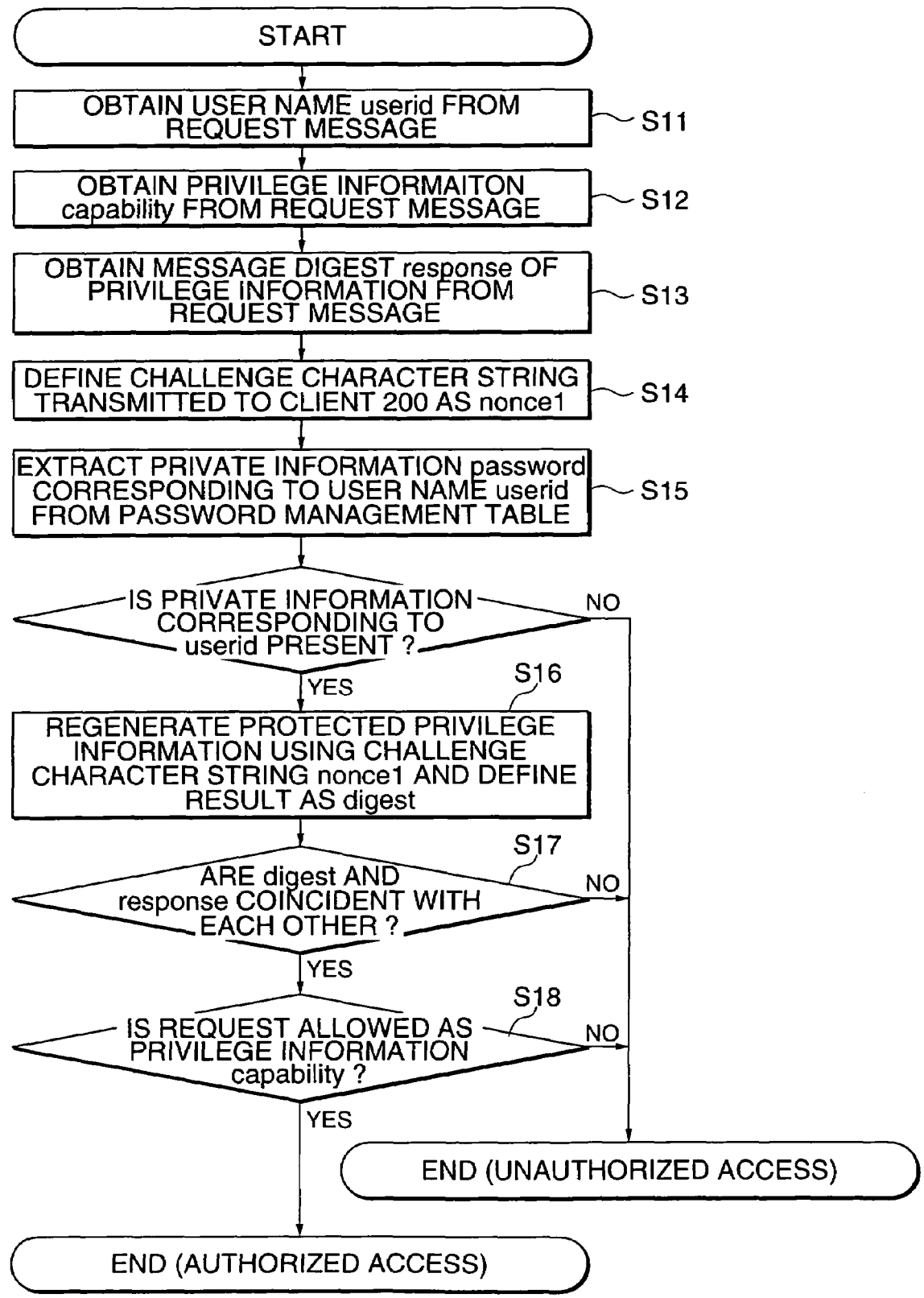
FIG. 4 is a flowchart depicting a procedure for causing an access control object 301 to make a decision as to legitimacy of an access, which is employed in a second embodiment of the present invention.

The access control object 301 of the HTTP server 300 takes out the following information from an Authorization field lying in the request message.
user information
privilege information and
message digest of privilege information Further, the access control object 301 executes an algorithm2 (see FIG. 4) shown below, based on these taken-out pieces of information, thereby making it possible to make a decision as to whether the client 200 is a person to which the access privileges to the HTTP object 391 have been legitimately transferred.

Algorithm2:
(Step 11) The user's name extracted from the Authorization field is defined as userid.
(Step 12) The privilege information extracted from the Authorization field is defined as capability.
(Step 13) The message digest of the privilege information extracted from the Authorization field is defined as response.
(Step 14) The value of a nonce field in the message transmitted to the client 200 is defined as noncel.
(Step 15) A password corresponding to the userid is obtained from a password management table. The password obtained from the password management table is defined as password. On the other hand, when the corresponding password is not registered, the request message issued from the client 200 is regarded as an unauthorized access and the present algorithm is completed.
(Step 16) A value MD (noncel+MD (capability+password)) of a one-way function is calculated and the result of calculation is defined as digest.
(Step 17) The digest is compared with the response. When the two are not equal to each other, the request message issued from the client 200 is judged as an unauthorized access and the present algorithm is terminated. When they coincide with each other, the access control object 301 proceeds to the next Step.
(Step 18) The access control object 301 checks for privilege's validity of a method (i.e., the contents of processing for each object), an object to be taken, an expiration date, etc., required by the client 200, based on the capability. If the request is one unauthorized or unallowed as capability, it is then judged as an unauthorized access and the present algorithm is ended. If the request falls within an allowable range, it is then judged as an authorized access and the present algorithm is completed.

When the request message is found to be the authorized access as a result of execution of the algorithm2, the access control object 301 transmits a message for starting up the GET method to the HTTP object 391.

Figure 5:
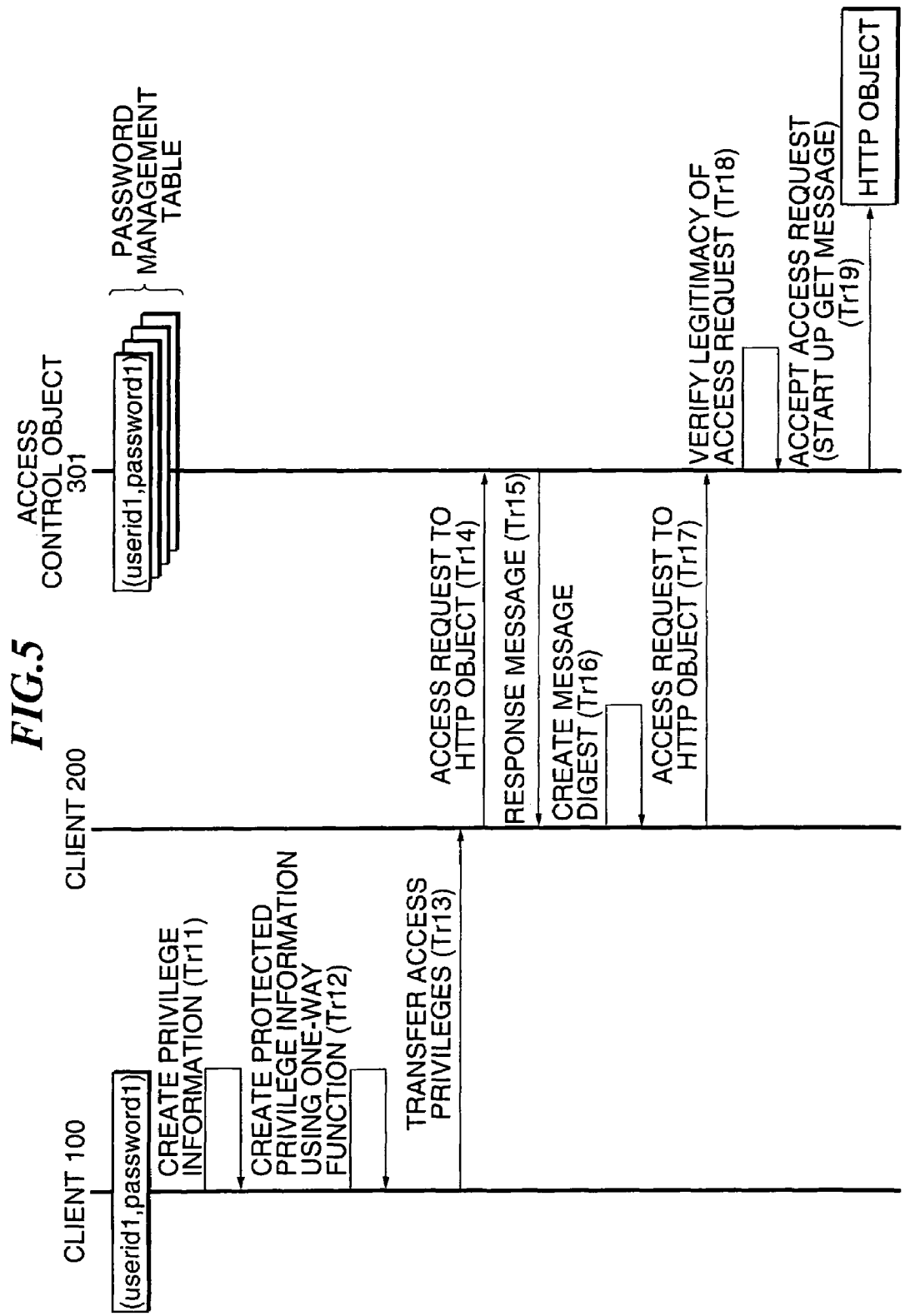
FIG. 5 illustrates transactions executed among a client 100, a client 200 and an HTTP server 300, which are employed in the second embodiment of the present invention.

FIG. 5 illustrates transactions executed among the client 100, client 200 and HTTP server 300 employed in the present embodiment. They will be described below with reference to the same drawing.

Assume that as a premise of the transactions, the client 100 holds therein its user information "userid1" and password "password1" as an account (qualifications for a user) for an access to the HTTP server 300. Further, the access control object 301 of the HTTP server 300 stores therein the combinations (userid1, password1), (userid2, password2), . . . of the user information about the respective clients 100 . . . and their passwords as the "password management table".

The client 100 creates privilege information capability1 which may be given to the client 200 as to an access to the HTTP object 391 (Tr11).

Next, the client 100 applies the one-way function MD to a bit string obtained by bit-concatenating its own secret information password1 with the back of the privilege information capability1 to thereby generate protected privilege information capabilityMD1 (Tr12).

Next, the client 100 transmits the user information userid1, the privilege information capability1 and the protected privilege information capabilityMD1 to the client 200 to thereby safely transfer access privileges thereto (Tr13).

The client 200 to which the access privileges have been transferred, transmits an access request to the HTTP object 391 to the HTTP server 300 (Tr14).

Since no authentication data is included in the access request, the access control object 301 of the HTTP server 300 transmits a response message including a challenge character string nonce (Tr15).

The client 200 generates a message digest response of a bit string obtained by bit-concatenating the challenge character string nonce and the protected privilege information capabilityMD1 (Tr16).

Further, the client 200 transmits an access request to the HTTP object 391 to the HTTP server 300 again (Tr17). The user name userid1, privilege information capability1 and message digest response of the client 100 are attached to the access request.

The access control object 301 of the HTTP server 300 verifies legitimacy of the access request issued from the client 200 (Tr18). This verification complies with the procedure defined by the aforementioned algorithm2 (see FIG. 4).

When the result of verification is successfully completed, the access control object 301 accepts the access request (Tr19). More specifically, the access control object 301 starts up a required method (e.g., GET method).

3. Third Embodiment

A third embodiment of the present invention will next be described. The second embodiment is applicable to such a distributed computing environment as shown in FIG. 1 in a manner similar to the above. However, the third embodiment is different from the first and second embodiments and is one for implementing the safe transfer of access privileges by applying an encryption function to privilege information without applying the one-way function thereto. While a description is made of an example shown below, in which a symmetric encryption key system is used, it should be sufficiently understood that the effect of the present invention is brought about similarly even in the case of the use of a public encryption key system.

In the present embodiment, an HTTP server 300 will be represented by a URL given as "http://www300". Further, the HTTP server 300 has an access control object 301, and N HTTP objects designated at reference numerals 391 through 39N. The respective HTTP objects 391 through 39N will be indicated by URLs given as "http://www300/object391", . . . , "http://www300/obj ect39N", respectively.

The access control object 301 is an object for controlling an access request to each of the HTTP objects 391 through 39N. However, the access control object 301 does not necessarily require the existence thereof over the same server as that for the HTTP objects 391 through 39N. The access control object 301 exists over another host (not shown), for example and may be invoked or called up from the HTTP server 300 on a remote basis so as to start up a predetermined access control process.

Each of a client 100 . . . has user information capable of identifying a user and a password used as secret information. Let's suppose that the client 100 has user information "userid1" and a password "password1".

The access control object 301 of the HTTP server 300 stores therein combinations (userid1, passwords), (userid2, password2), . . . of the user information about the respective clients 100 . . . and their passwords as a "password management table" (tentative name).

Further, the access control object 301 holds therein "capability" with respect to a client user to which access privileges to each object are given. The capability indicates information obtained by cutting out the access control matrix (described above) for every row, i.e., every user. It shows information descriptive of an operation privilege of each user, which is allowed to each HTTP object.

Each of the client 100 . . . provides the HTTP server 300 with its own user information and password, thereby making it possible to obtain access to each of the HTTP object 391, . . . within a range of capability supplied thereto, i.e., privilege information.

In the present embodiment, the exchange of HTTP messages will be carried out in accordance with a Basic Authentication Scheme (BAS) of HTTP 1.1. Namely, the client 100 is able to issue the following HTTP request to thereby start up a GET method of the HTTP object 391.

GET/object391HTTP/1.1

Authorization: Basic authdata     [Expression 13]

where, "authdata" indicates a character string obtained by encoding a bit string userid1:password1 formed by concatenating user information and passwords with one another in accordance with the line feed-free base64 encode method (described above).

Next, an access privilege transferring method according to the present embodiment will be described with the transfer of privilege information from the client 100 to the client 200 as an example.

The privilege information has a character string including the following respective matters or items (however, they are merely illustrated by way of example and other matters such as the number of permissions for use may be included in the privilege information).

string of object's names
string of method's names
the date of commencement of the period of validity and
the date of end of the period of validity Now consider where the client 100 has generated the following privilege information character string capability1 to transfer access privileges to the client 200.

((/object391),(GET),Apr:24:10:00:00:48:1999:GMT,

Apr:25:10:00:00:48:1999:GMT)     [Expression 14]

The privilege information character string indicates a right to allow the execution of only a GET method with respect to the HTTP object 391 represented by "/object391" only during a period of from 0 minute 48 seconds past ten, Apr., 24 in 1999 at GMT to 0 minute 48 seconds past ten, Apr. 25 in 1999 at GMT.

In the present embodiment, the client 200 will handle only names in the server as the object's names because it is intended for the HTTP server 300 alone. However, the client 200 may identify objects of plural HTTP servers by using global identifiers such as a URL as the object's names.

Next, the client 100 encrypts the privilege information capability1 by using its own secret information password1 to thereby generate protected privilege information capabilityCR1 shown below.

CRYPT((((/object),(GET),Apr:24:10:00:00:48:1999: GMT,

Apr:25:10:00:00:48:1999:GMT),password1)     [Expression 15]

Of the above information, an encryption function CRYPT can make use of an arbitrary symmetric key cryptosystem such as DES (Data Encryption Standard), RC2, RC4 and RC5. The DES is a common key cryptosystem authorized or certified as standard encryption or cipher by the U.S. government. A key has a 56-bit fixed length (64 bits inclusive of a parity bit represented by 8 bits). Firstly, 16 keys each having a 48-bit length are created from the key having the 56-bit length, and data blocks divided into 64-bit lengths by using the 16 keys are stirred only 16 times.

Further, the RC2, RC4 and RC5 are respectively a common key cryptosystem developed by RSA Data Security Inc. in the U.S. Of these, the RC2 is a block cipher in which data is encrypted for each block, and is capable of varying the length of a cipher key. The RC4 adopts a cryptosystem called "stream type". The RC5 is a cryptosystem capable of varying both a key length and a data block length.

Owing to the application of such an encryption function CRYPT to the original privilege information, each third party who does not know the secret or cryptic information password1, is not able to freely tamper with the protected privilege information capabilityCR1.

Next, the client 100 transmits information including at least the following to another client 200.
userid1 (user information) and
capabilityCR1 (protected privilege information)

As already described above, the third parties (including the client 200) who do not know the secret or cryptic information password1 are not able to tamper with the protected privilege information capabilityCR1. It is thus understood that the client 100 is able to safely transfer access privileges to the HTTP object 391 to another client 200.

On the other hand, the client 200 having received the information referred to above provides a service for obtaining access to the HTTP object 391 as a representative of the client 100.

The client 200 transmits a request message including at least the following to the HTTP server 300 to access the HTTP object 391.
object's name
method's name
user's name
encrypted privilege information In the present embodiment, such a request message as shown below is transmitted.

GET/object391HTTP/1.1

Authorization: Capability cap1    [Expression 16]

Now, a character string cap1 will be defined as a character string obtained by coupling the user's name and the encrypted privilege information to each other by using ":" and encoding it by the line feed-free base64 encode method (described above).

Figure 6:
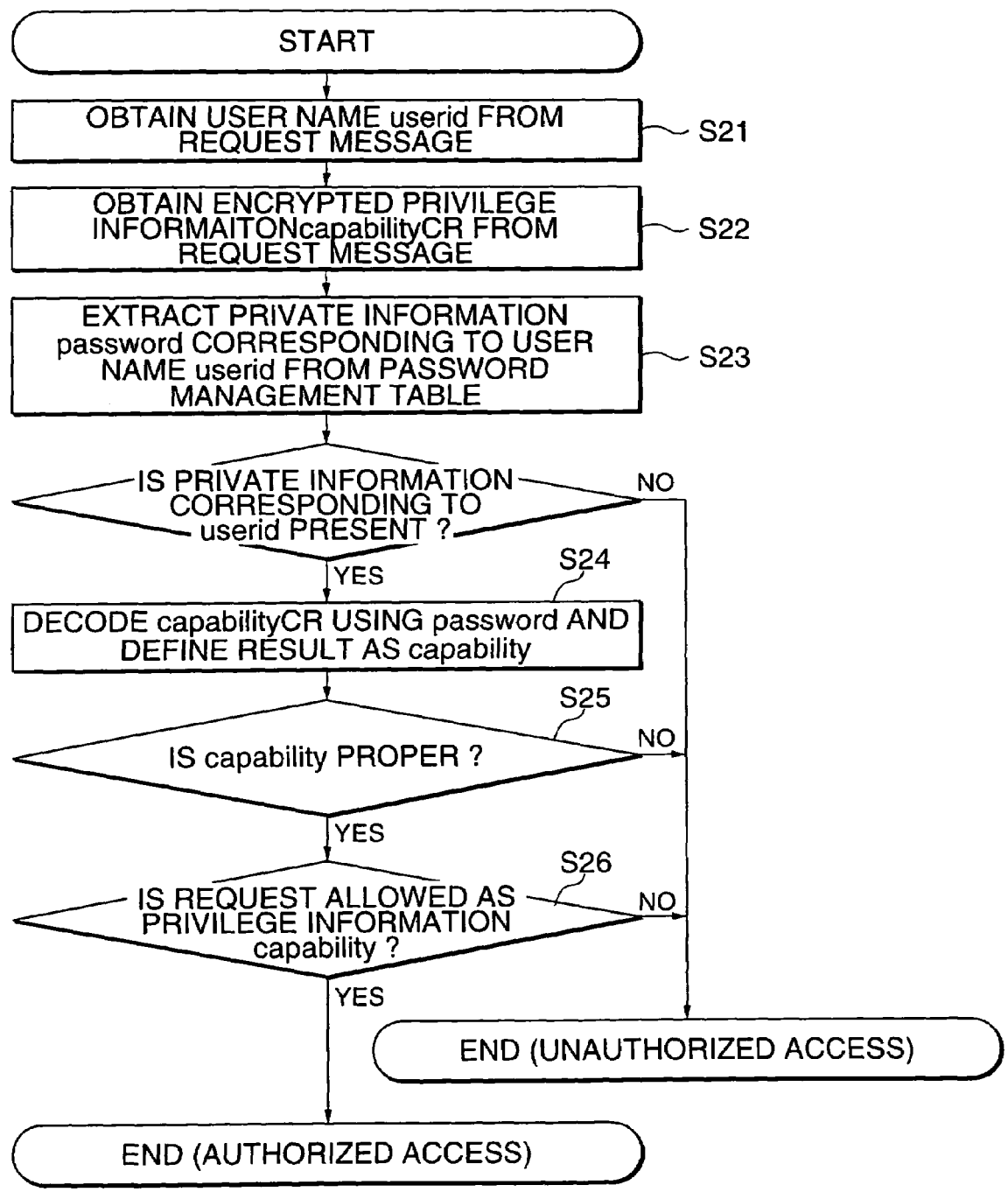
FIG. 6 is a flowchart showing a procedure for allowing an access control object 301 to determine legitimacy of an access, which is employed in a third embodiment of the present invention.

The access control object 301 of the HTTP server 300 takes out the following information from an Authorization filed lying in the request message.
user information and
encrypted privilege information Further, the access control object 301 executes the following algorithm3 (see FIG. 6), based on these taken-out pieces of information, thereby making it possible to make a decision as to whether the client 200 is a person to which the access privileges to the HTTP object 391 have been legitimately transferred.

Algorithm3:
(Step 21) The user's name extracted from the Authorization field is defined as userid.
(Step 22) The encrypted privilege information extracted from the Authorization field is defined as capabilityCR.
(Step 23) A password corresponding to the userid is obtained from a password management table. The password obtained from the password management table is defined as password. On the other hand, when the corresponding password is not registered therein, a request message issued from the client 200 is regarded as an unauthorized access and the present algorithm is terminated.
(Step 24) The encrypted privilege information capabilityCR is decrypted by using the secret information password. The result of decrypting is defined as capability.
(Step 25) It is judged whether the decrypted privilege information capability conforms to the proper grammatical rule. If it is found to be improper, then the request message issued from the client 200 is judged as an unauthorized access and the present algorithm is completed. If it is found to be proper, then the access control object 301 proceeds to the next Step.
(Step 26) The access control object 301 checks for privilege's validity of a method (i.e., the contents of processing for each object), an object to be taken, an expiration date, etc., required by the client200, based on the decrypted capability. If the request is one unauthorized or unallowed as capability, it is then judged as an unauthorized access and the present algorithm is terminated. If the request falls within an allowable range, it is then judged as an authorized access and the present algorithm is completed.

When the request message is found to be the authorized access as a result of execution of the algorithm3, the access control object 301 transmits a message for starting up the GET method to the HTTP object 391.

Figure 7:
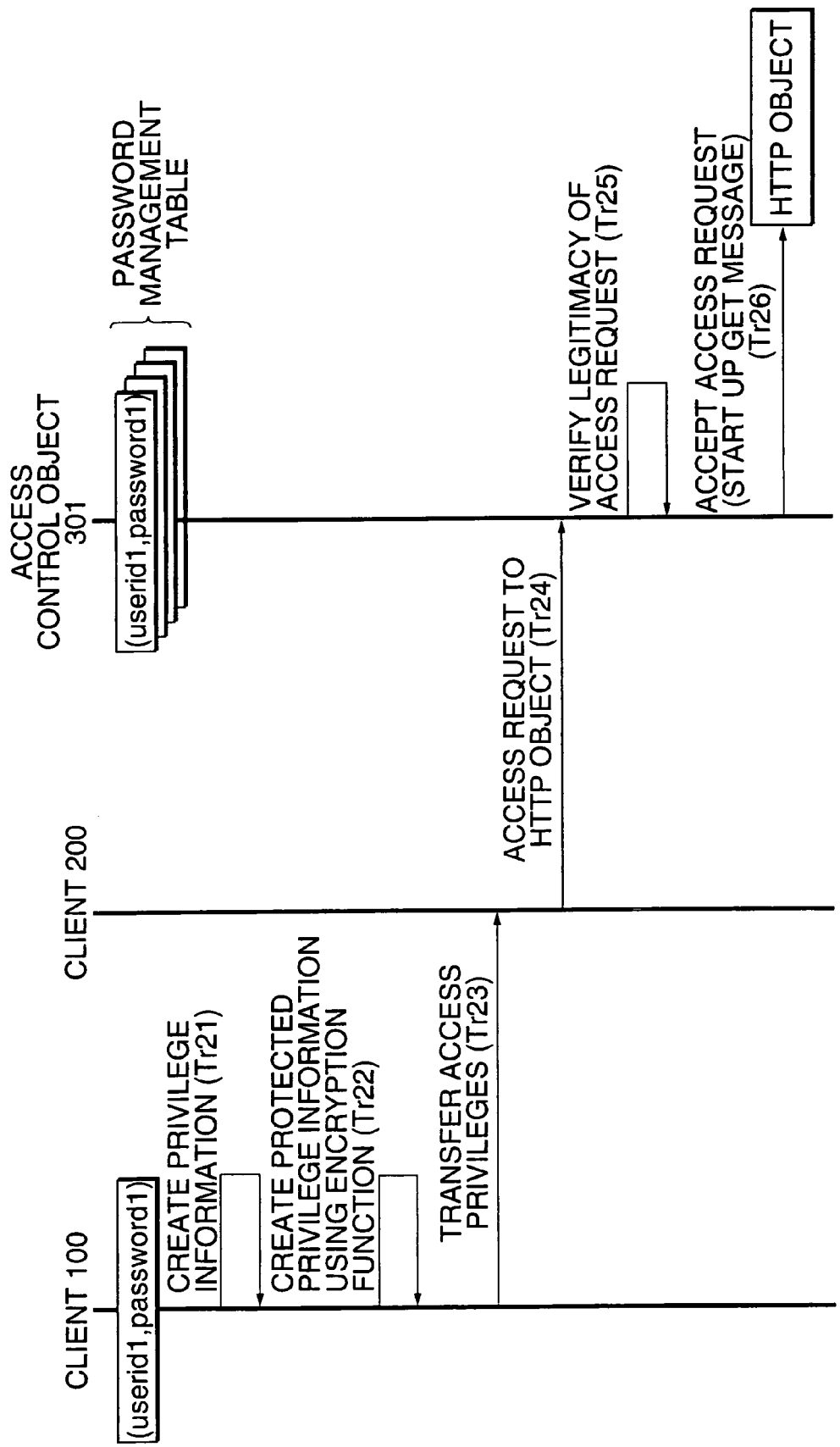
FIG. 7 illustrates transactions executed among a client 100, a client 200 and an HTTP server 300, which are employed in the third embodiment of the present invention.

FIG. 7 illustrates transactions executed among the client 100, client 200 and HTTP server 300 employed in the present embodiment. They will be described below with reference to the same drawing.

Let's assume that as a premise of the transactions, the client 100 holds therein its user information "userid1" and password "password1" as an account (qualifications for a user) for an access to the HTTP server 300. Further, the access control object 301 of the HTTP server 300 stores therein the combinations (userid1, password1), (userid2, password2), . . . of the user information about the respective clients 100 . . . and their passwords as the "password management table".

The client 100 creates privilege information capability1 which may be given to the client 200 as to an access to the HTTP object 391 (Tr1).

Next, the client 100 encrypts the privilege information capability1 by using its own secret information password1 to thereby generate protected privilege information capabilityCR1 (Tr22).

Next, the client 100 transmits the protected privilege information capabilityCR1 to the client 200 to thereby safely transfer access privileges thereto (Tr23).

The client 200 to which the access privileges have been transferred, transmits an access request to the HTTP object 391 to the HTTP server 300 (Tr24). The user name userid1 and protected privilege information capabilityCR1 of the client 100 are attached to the access request.

The access control object 301 of the HTTP server 300 verifies legitimacy of the access request issued from the client 200 (Tr25). This verification complies with the procedure defined by the aforementioned algorithm3 (see FIG. 6).

When the result of verification is successfully completed, the access control object 301 accepts the access request (Tr26). Described more specifically, the access control object 301 starts up a required method (e.g., GET method).

4. Fourth Embodiment

A fourth embodiment of the present invention will next be described. The fourth embodiment is applicable to such a distributed computing environment as shown in FIG. 1 in the same manner as described above. The fourth embodiment is one in which privilege information is encrypted and the "challenge response verification" (described above) is used upon a client-to-HTTP server access request to thereby implement or achieve the safe transfer of access rights or privileges.

In the present embodiment, an HTTP server 300 will be represented by a URL given as "hyperlink http://www300". Further, the HTTP server 300 has an access control object 301 and N HTTP objects designated at reference numerals 391 through 39N. The HTTP objects 391 through 39N will be respectively represented by URLs given as "hyperlink http://www300/object391, . . . , http://www300/object39N".

The access control object 301 is an object for controlling an access request to each of the HTTP objects 391 through 39N. However, the access control object 301 does not necessarily require the existence thereof over the same server 300 as that for the HTTP objects 391 through 39N. The access control object 301 exists over another server (not shown), for example and may be invoked or called up from the HTTP server 300 on a remote basis so as to start up a predetermined access control process.

Each of clients 100 . . . has user information capable of identifying a user and a password used as secret information. Let's suppose that the client 100 has user information "userid1" and a password "password1".

The access control object 301 of the HTTP server 300 stores therein combinations (userid1, password1), (userid2, password2), . . . of the user information about the respective clients 100 . . . and their passwords as a "password management table" (tentative name).

Further, the access control object 301 holds therein "capability" with respect to a client user to which access privileges to each object are given. The capability indicates information obtained by cutting out the access control matrix (described above) for every row, i.e., every user. It shows information descriptive of an operation right or privilege of each user, which is allowed to each HTTP object.

Each of the clients 100 . . . provides the HTTP server 300 with its own user information and password, thereby making it possible to obtain access to each of the HTTP object 391, . . . within a range of capability supplied thereto, i.e., right or privilege information.

In the present embodiment, the exchange of HTTP messages will be carried out in accordance with a Digest Authentication Scheme (Basic Authentication Method) of HTTP1 1. Namely, the client 100 is able to issue the following HTTP request to thereby start up a GET method of the HTTP object 391.

GET/object391HTTP/1.1

Authorization: Digest digest-response [Expression 17]

where, "digest-response" indicates authentication data generated based on the provision of HTTP1.1.

Next, an access right or privilege transferring method according to the present embodiment will be described with the transfer of privilege information from the client 100 to the client 200 as an example.

The privilege information has a character string including the following respective matters or items (however, they are merely illustrated by way of example and other matters such as the number of permissions for use, etc., may be included in the privilege information).

string of object's names
string of method's names
the date of commencement of the period of validity and
the date of end of the period of validity Now consider where the client 100 has generated the following privilege information character string capability1 to transfer access privileges to the client 200.

((/object391),(GET),Apr:24:10:00:48:1999:GMT,

Apr:25:10:00:48:1999:GMT) [Expression 18]

The privilege information character string indicates a right to allow the execution of only a GET method with respect to the HTTP object 391 represented by "/object391" only during a period of from 0 minute 48 seconds past ten, Apr., 24 in 1999 at GMT to 0 minute 48 seconds past ten, Apr. 25 in 1999 at GMT.

Next, the client 100 encrypts the privilege information capability1 by using its own secret information password1 to thereby generate protected privilege information capabilityCR1 shown below.

CRYPT(((/object),(GET),Apr:24:10:00:48:1999: GMT,

Apr:25:10:00:48:1999:GMT),password1) [Expression 19]

Of the above information, an encryption function CRYPT can make use of the arbitrary symmetric key cryptosystem (described above) such as DES (Data Encryption Standard), RC2, RC4 and RC5. Owing to the application of such encryption to the original privilege information, none of third parties who do not know the secret information password1 is able to arbitrarily tamper with the protected privilege information capabilityCR1.

Next, the client 100 transmits information including at least the following to another client 200.

userid1 (user information)
capability1 (privilege information) and
capabilityCR1 (protected privilege information)

As already described above, the third parties (including the client 200) who do not know the secret information password1 are not able to tamper with the protected privilege information capabilityCR1. It is thus understood that the client 100 is able to safely transfer access rights or privileges to the HTTP object 391 to another client 200.

On the other hand, the client 200 having received the information referred to above provides a service for obtaining access to the HTTP object 391 as a representative of the client 100.

The client 200 first transmits such a message as shown below to the HTTP server 300 to access the HTTP object 391.

GET/object391HTTP1.1 [Expression 20]

Since no authentication data is included in the request message in this case, the HTTP server 300 transmits the following response message to the client 200.

HTTP/1.1 401 Unauthorized

WWW-Authenticate: Capability realm="private@fujixerox.cojp", qop="auth,auth-int",
    nonce="0a093dad98c11d0f600cfc7102dd2f10e8c"

opaque="a9f0171e7f40e415aa951069a403ecaf" [Expression 21]

Of the above message, a character string substituted into nonce corresponds to the "challenge character string" (described above) for executing "challenge response authentication".

The client 200 calculates a value obtained by encrypting the challenge character string nonce by using the protected privilege information capabilityCR1. If described in this example, an expression shown below is calculated as follows:

CRYPT("0a093dad98c11d0f600cfc7102dd2f10e8c",
    capabilityCR1) [Expression 22]

Further, other character strings may also be joined. The following expression may be calculated as in the case of HTTP/1.1, for example.

CRYPT(CRYPT(userid1":"private@fujixerox.co.jp":"

capabilityCR1)+nonce":"cnonce":"qop":"

CRYPT(GET":""/object391"))            [Expression 23]

The result of calculation is defined as response1. The client 200 transmits the following request message to the HTTP server 300 to obtain access to the HTTP object 391.

GET/object391HTTP/1.1

Authorization: Capability username=userid1 realm="provate@fujixerox.co.jp", nonce="0a093dad98c11d0f600cfc7102dd2f0e8c", uri="/object391", qop=auth, nc=00000001, cnonce="1bce22bf", capability=capability1, response=response1, opaque="a9f0171e7f40e415aa951069a403ecaf"    [Expression 24]

Figure 8:
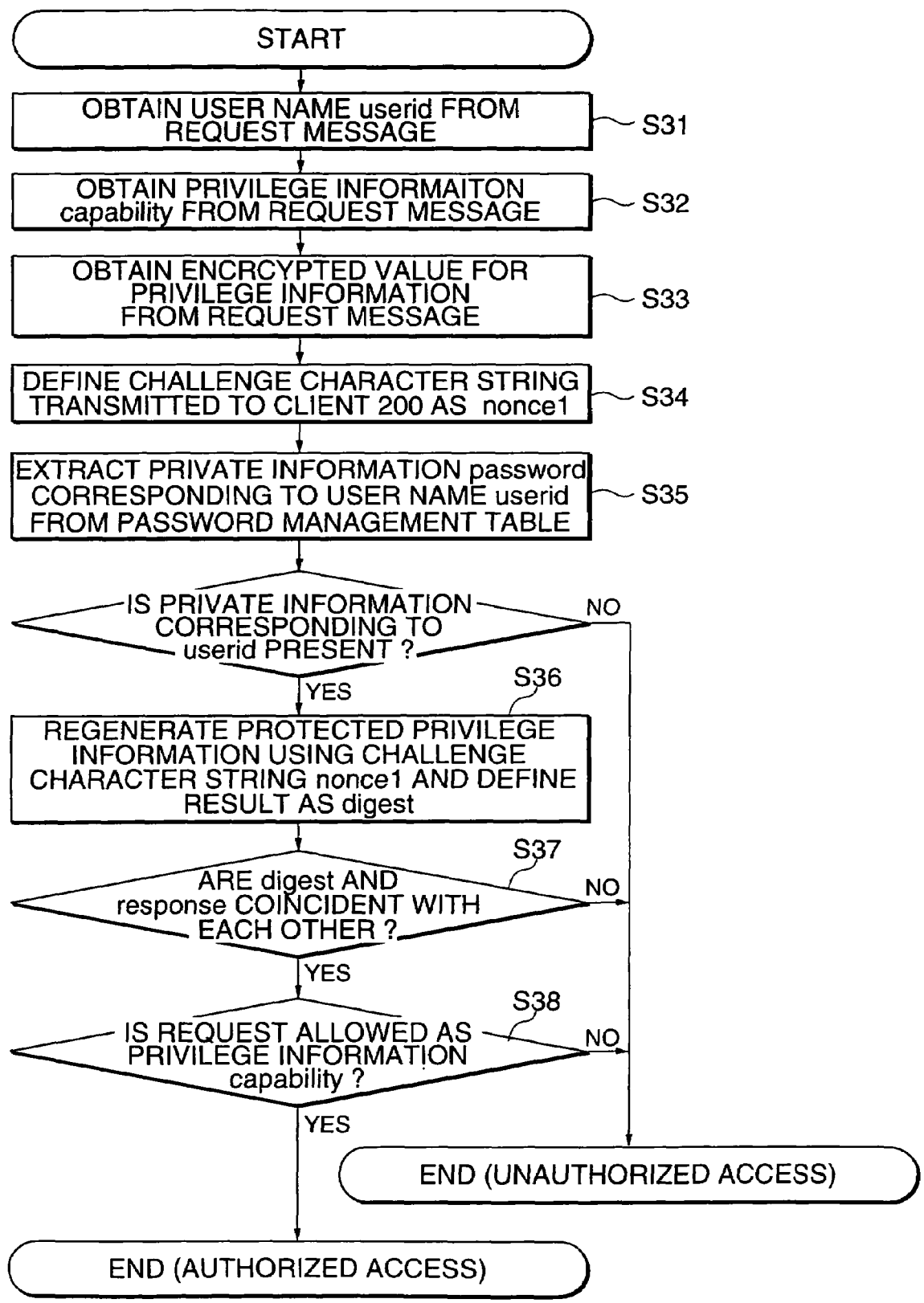
FIG. 8 is a flowchart showing a procedure for allowing an access control object 301 to make a decision as to legitimacy of an access, which is employed in a fourth embodiment of the present invention.

The access control object 301 of the HTTP server 300 takes out the following information from an Authorization field lying in the request message.
  user information
  privilege information and
  encrypted value of privilege information Further, the access control object 301 executes an algorithm4 (see FIG. 8) shown below, based on these taken-out pieces of information, thereby making it possible to make a decision as to whether the client 200 is a person to which the access privileges to the HTTP object 391 have been legitimately transferred.

Algorithm4:

(Step 31) The user's name extracted from the Authorization field is defined as userid.

(Step 32) The privilege information extracted from the Authorization field is defined as capability.

(Step 33) The encrypted value of the privilege information extracted from the Authorization field is defined as response.

(Step 34) The value of a nonce field in the message transmitted to the client 200 is defined as noncel.

(Step 35) A password corresponding to the userid is obtained from a password management table. The password obtained from the password management table is defined as password. On the other hand, when the corresponding password is not registered, the request message issued from the client 200 is regarded as an unauthorized access and the present algorithm is completed.

(Step 36) A value CRYPT (noncel, CRYPT (capability, password)) of an encryption function is calculated and the result of calculation is defined as digest.

(Step 37) The digest is compared with the response. When the two are not equal to each other, the request message issued from the client 200 is judged as an unauthorized access and the present algorithm is terminated. When they coincide with each other, the access control object 301 proceeds to the next Step.

(Step 38) The access control object 301 checks for privilege's validity of a method (i.e., the contents of processing for each object), an object to be taken, an expiration date, etc., required by the client 200, based on the capability. If the request is one unauthorized or unallowed as capability, it is then judged as an unauthorized access and the present algorithm is ended. If the request falls within an allowable range, it is then judged as an authorized access and the present algorithm is completed.

When the request message is found to be the authorized access as a result of execution of the algorithm4, the access control object 301 transmits a message for starting up the GET method to the HTTP object 391.

Figure 9:
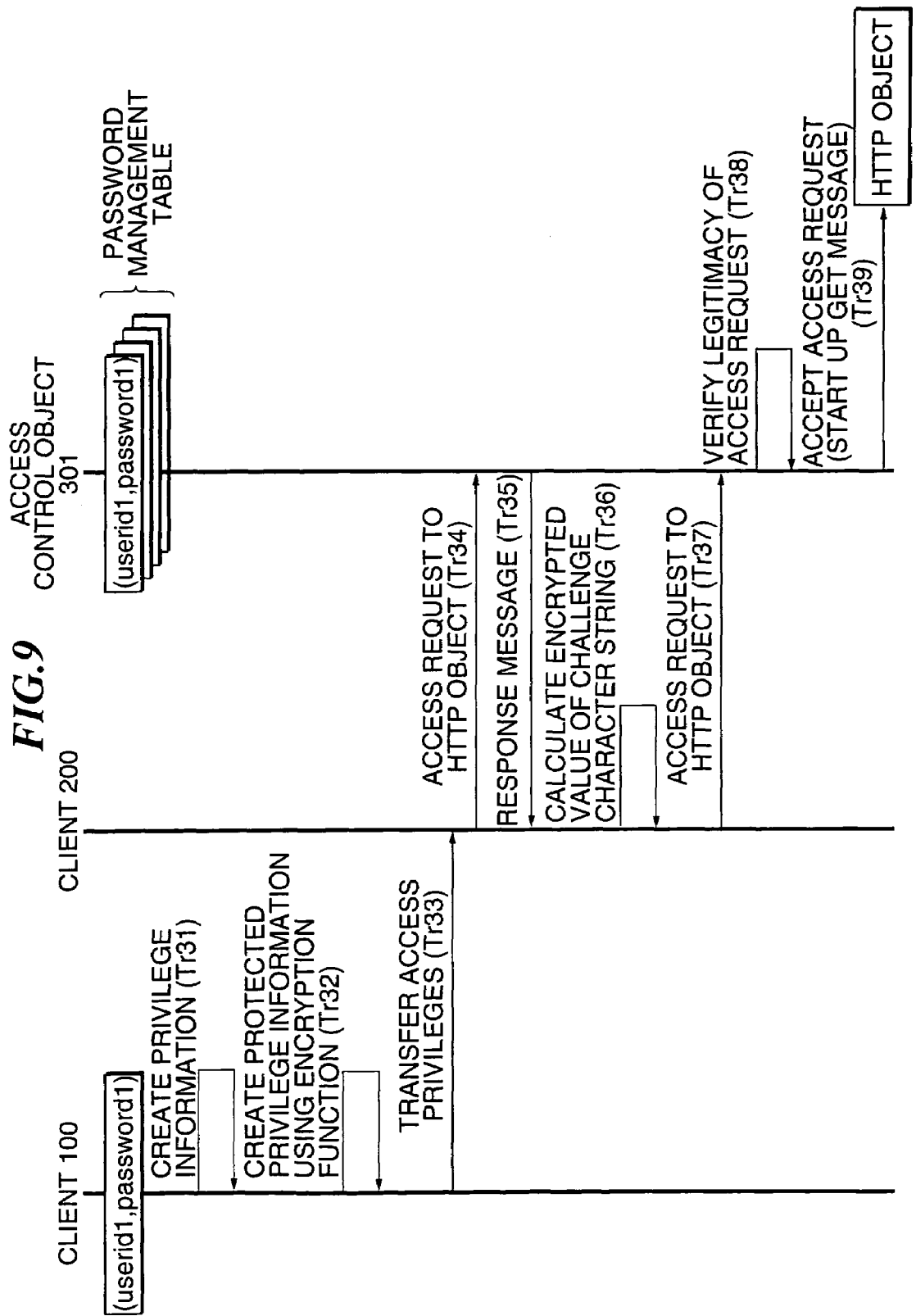
FIG. 9 illustrates transactions executed among a client 100, a client 200 and an HTTP server 300, which are employed in the fourth embodiment of the present invention.

FIG. 9 illustrates transactions executed among the client 100, client 200 and HTTP server 300 employed in the present embodiment. They will be described below with reference to the same drawing.

Let's assume that as a premise of the transactions, the client 100 holds therein its user information "userid1" and password "password1" as an account (qualifications for a user) for an access to the HTTP server 300. Further, the access control object 301 of the HTTP server 300 stores therein the combinations (userid1, password1), (userid2, password2), ... of the user information about the respective clients 100 ... and their passwords as the "password management table".

The client 100 creates privilege information capability1 which may be given to the client 200 as to an access to the HTTP object 391 (Tr31).

Next, the client 100 encrypts the privilege information capability1, using its own secret information password1 to thereby create protected privilege information capability-CRYPT1 (Tr32).

Next, the client 100 transmits the user information userid1, the privilege information capability1 and the protected privilege information capabilityCRYPT1 to the client200 to thereby transfer access privileges thereto (Tr33).

The client 200 to which the access privileges have been transferred, transmits an access request to the HTTP object 391 to the HTTP server 300 (Tr34).

Since no authentication data is included in the access request, the access control object 301 of the HTTP server 300 transmits a response message including a challenge character string nonce (Tr35).

The client 200 encrypts the challenge character string nonce through the use of the protected privilege information capabilityCR1 to thereby generate response (Tr36).

Further, the client 200 transmits an access request to the HTTP object 391 to the HTTP server 300 again (Tr37). The user name userid1, privilege information capability1 and response of the client 100 are attached to the access request.

The access control object 301 of the HTTP server 300 verifies legitimacy of the access request issued from the client 200 (Tr38). This verification complies with the procedure defined by the aforementioned algorithm4 (see FIG. 8).

When the result of verification is successfully completed, the access control object 301 accepts the access request (Tr39). More specifically, the access control object 301 starts up a required method (e.g., GET method).

5. Method of Safely Storing Protected Privilege Information:

According to the first through fourth embodiments, each of the clients 100 applies the one-way function MD and the encryption function CRYPT to the privilege information capability1 without delivering its own password1 to another client 200 as it is and transmitting the privilege information capability1 itself given to the client 200 upon transfer of the access privileges to each HTTP object, thereby to bring the privilege information into the form of such "protected privilege information" as not to be able to tamper illegally, followed by transfer to the client 200.

As a result, the opportunity (for example, to prolong the period of validity without permission, increase the effective number of uses and strengthen an operation privilege to each object) to arbitrarily rewrite the contents of privilege information and obtain an unauthorized access to each HTTP object can be suitably eliminated.

However, although the privilege information is set in protected format, even persons to which no privilege is properly transferred are able to access the HTTP objects by duplicating the privilege information.

Figure 10:
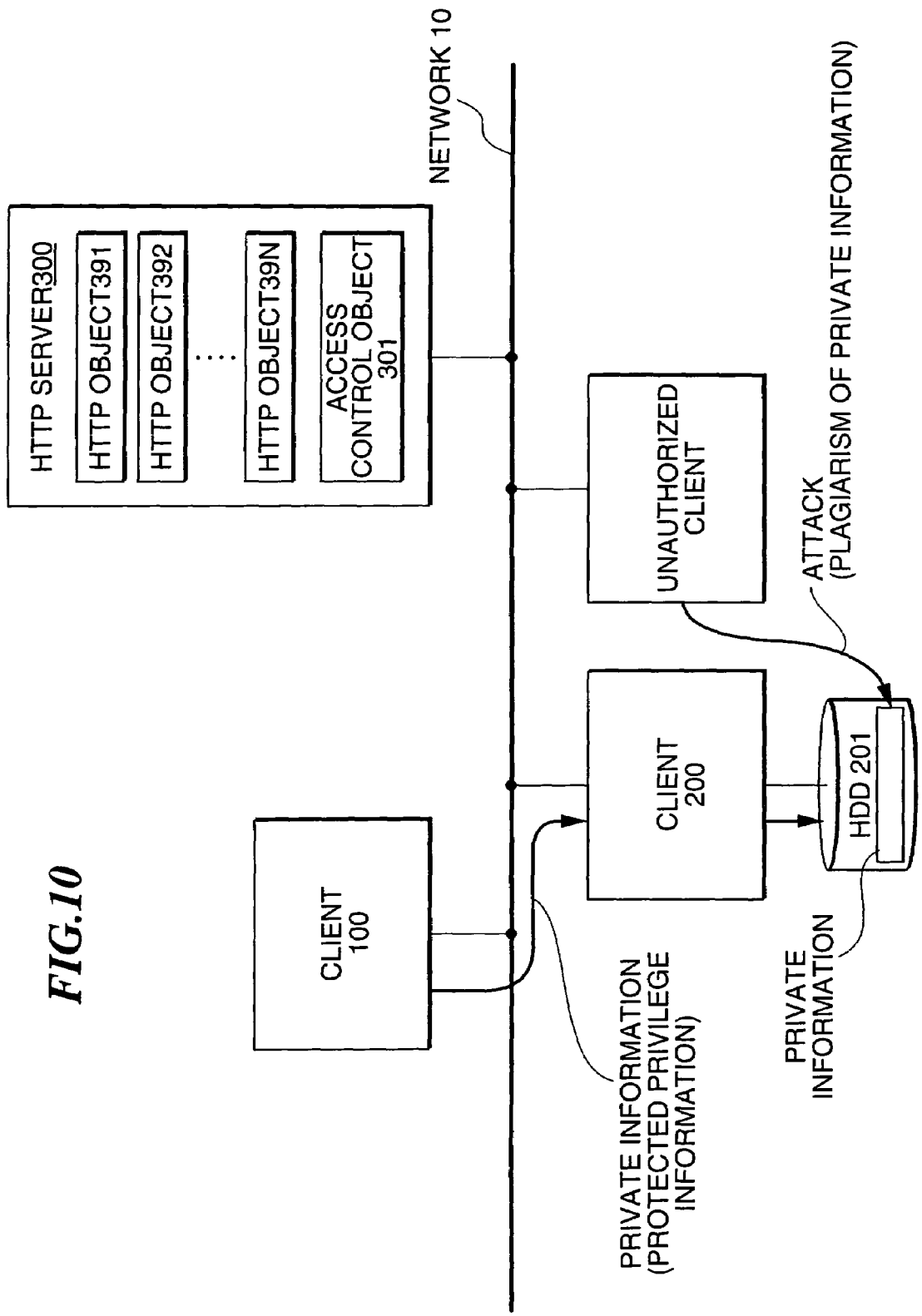
FIG. 10 is a diagram typically showing a distributed computing environment according to an embodiment of the present invention and more specifically illustrates the manner in which protected privilege information stored in a secondary memory device of a client 200 is illegally used.

Even if a client 200 having accepted access privileges properly from a client 100 utilizes its own privilege information properly alone as shown in FIG. 10 by way of example, a secondary memory device (e.g., hard disk drive) 201 having stored protected privilege information therein is placed under attack. As a result, this could lead to leakage of the protected privilege information and a bad use thereof. While it is relatively easy to protect protected privilege information loaded onto a memory space, i.e., a volatile memory, information stored onto a file space, i.e., a local disk cannot be protected easily. Since a local disk mutually used between remote hosts is in a transparent condition under a distributed computing environment in particular, it is prone to bear an attack.

A description will be made below of methods for allowing clients 200 to store protected privilege information transferred thereto into their corresponding local disks in safety and on a non-volatile basis.

5-1. Method 1:

Firstly, the client 100 transmits protected privilege information to another client 200.

Next, the client 100 transmits an encryption key to the client 200.

When the client 200 stores the protected privilege information in its own local disk 201, it encrypts the protected privilege information by using the received encryption key and thereafter stores the encrypted information therein. As a result, since the protected privilege information has been encrypted even if an unauthorized client makes an attack against the local disk 201, there is no fear of abuse of the information even in the event of leakage thereof.

When the client 200 makes an access request to an HTTP object 391, it extracts the protected privilege information form the local disk 201. Further, the client 200 decrypts it with the encryption key and may use the result of decrypting. It should be fully understood that since the protected privilege information exists only onto the memory of the client 200, security control or management thereof becomes easy.

An access request to an HTTP server 300 and an authentication procedure therefor comply with the above.

5-2. Method 2:

First of all, the client 100 encrypts protected privilege information by an encryption key to generate privilege information protected in duplicate.

Next, the client 100 transmits the double-protected privilege information to another client 200.

Further, the client 200 stores the received protected privilege information in its corresponding local disk 201 as it is. The protected privilege information is protected in duplicate and cannot be used for an access request as it is. Thus, since the protected privilege information has been encrypted even if an unauthorized client makes an attack against the local disk 201, there is no fear of abuse of the information even in the event of leakage thereof.

When the client 200 desires to issue an access request for each object, it may receive a decryption key for decrypting the double-protected privilege information from the client 100.

Further, the client 200 decrypts the double-protected privilege information by using the received decryption key. As a result, the client 200 is able to obtain the protected privilege information in available form. It should be understood in full that since the protected privilege information exists only onto the memory of the client 200, security control or management thereof becomes easy.

An access request to the HTTP server 300 and an authentication procedure therefor comply with the above.

Incidentally, the encryption key and the decryption key may be the same key employed in the symmetric key cryptosystem or may be a combination of a private key and a public key employed in a public key cryptosystem.

5-3. Method 3:

Firstly, the client 100 transmits protected privilege information to another client 200.

The client 200 prepares an encryption key for encrypting information and a decryption key for decrypting the information encrypted by the encryption key. The encryption key and the decryption key may be a combination of a private key and a public key employed in a public key cryptosystem.

The client 200 transmits the decryption key to the client 100. When the decryption key is stored in the local disk 201, an unauthorized client makes an attack against the local disk 201, thus causing a danger of leaking to the outside. Therefore, the client 200 may preferably discard the decryption key immediately after the transmission of the decryption key to the client 100.

The client 200 further encrypts the protected privilege information by means of the encryption key and stores the result of encrypting in the local disk. As a result, since the protected privilege information has been encrypted even if an unauthorized client makes an attack against the local disk 201, there is no fear of abuse of the information even in the event of leakage thereof.

When the client 200 desires to issue an access request for each object, it takes out the privilege information protected in duplicate from the local disk 201. Further, the client 200 decrypts it with the decryption key and may regenerate the original protected privilege information. However, when the client 200 has discarded the decryption key, it may get a decryption key from the client 100 again. It should be fully understood that since the protected privilege information exists only onto the memory of the client 200, security control thereof becomes easy.

An access request to the HTTP server 300 and an authentication procedure therefor comply with the above.

5-4. Method 4:

The client 100 first transmits protected privilege information to another client 200.

Next, the client 200 transmits a challenge character string for executing the "challenge response authentication" (described above) to the client 100.

Next, the client 100 applies a predetermined calculating operation to the received challenge character string and predetermined secret information to thereby generate an encryption key. Further, the client 100 transmits the generated encryption key to the client 200.

On the other hand, the client 200 encrypts the protected privilege information through the use of the received encryption key and stores the result of encrypting in the local disk 201. As a result, since the protected privilege information has been encrypted even if an unauthorized client makes an attack against the local disk 201, there is no fear of abuse thereof even in the event of leakage thereof.

When the client 200 makes an access request to the HTTP object 391, it takes out the protected privilege information from the local disk 201. Further, the client 200 decrypts the protected privilege information with the encryption key and may use the result of decrypting. It should be fully understood that since the protected privilege information exists only onto the memory of the client 200, security control thereof becomes easy.

An access request to the HTTP server 300 and an authentication procedure therefor comply with the above.

Incidentally, each of the methods referred to above has described as an example the cases where the protected privilege information is stored in the local disk 201 safely and on the non-volatile basis. However, the stored information is not necessarily limited to the protected privilege information. The methods can be applied even to the storage of other information (such as a user's password, etc.) high in privacy.

The present invention has been described above in details with reference to the specific embodiments. However, it is apparent to those skilled in the art that various modifications and substitutes of the illustrative embodiments can be made within the scope not departing from the substance of the present invention. Namely, the present invention has been disclosed as the illustrative embodiments and should not be construed in a limiting sense. The appended claims should be taken into consideration to determine the substance of the present invention.

Incidentally, the URL (Uniform Resource Locator) has been described in, for example, RFC (Request For Comments) 1738, RFC1808, etc. Further, the HTML (Hyper Text Markup Language) has been described in, for example, RFC1866. Furthermore, the HTTP (Hyper Text Transfer Protocol) has been described in, for example, RFC1945 and RFC2068.

According to the present invention as described above in detail, an excellent access right or privilege transferring method can be provided which is capable of safely transmitting "Capability" descriptive of access rights or privileges related to each object between subjects (users).

According to the present invention as well, an excellent access right or privilege transferring method can be provided which is capable of safely transmitting "Capability" descriptive of access privileges related to each object between plural hosts (users) under a distributed computing environment in which the plural hosts are connected to one another by a network and the objects are scattered over the network.

Further, according to the present invention, an excellent access right or privilege transferring method can be provided wherein subjects holding capability therein can freely generate capability whose contents of privilege or privileges has been changed, and the generated capability can be transferred to other objects in safety.

Furthermore, according to the present invention, an excellent access right or privilege transferring method can be provided wherein subjects holding capability therein can freely generate capability whose contents of privilege has been changed, and a manager of each object can safely check for the generated capability.

What is claimed is:

1. An information managing method for safely managing secret information between clients, and between clients and servers, over an object space in which at least one server for providing objects and at least one client requiring the objects are connected to one another by a network, comprising:
   transmitting secret information from at least a first of a plurality of clients to at least a second of the plurality of clients;
   transmitting an encryption key from the at least the first of the plurality of clients to the at least the second of the plurality of clients;
   encrypting, by the at least the second of the plurality of clients, the secret information by using the encryption key transmitted from the first of the plurality of clients; and
   storing the encrypted secret information, by the at least the second of the plurality of clients, in a secondary memory device.

2. An information managing method for safely managing secret information between clients, and between clients and servers, over an object space in which at least one server for providing objects and at least one client requiring the objects are connected to one another by a network, comprising:
   applying a predetermined calculating operation to secret information to generate an encryption key by at least a first of a plurality of clients;
   encrypting secret information by using the generated encryption key, thereby generating protected secret information by the at least the first of the plurality of clients;
   transmitting the protected secret information from the at least the first of the plurality of clients to at least a second of the plurality of clients;
   storing, by the at least the second of the plurality of clients, the received protected secret information in a secondary memory device;
   transmitting a decryption key for decrypting the information encrypted by the generated encryption key from the at least the first of the plurality of clients to the at least the second of the plurality of clients; and
   decrypting, by the at least the second of the plurality of clients, the protected secret information by using the decryption key, thereby obtaining the secret information.

3. The information managing method according to claim 2, wherein the encryption key is identical to the decryption key.

4. An information managing method for safely managing secret information between clients, and between clients and servers, over an object space in which at least one server for providing objects and at least one client requiring the objects are connected to one another by a network, comprising:
   transmitting secret information from at least a first of a plurality of clients to at least a second of a plurality of clients;
   holding, by the at least the second of the plurality of clients, an encryption key for encrypting information and a decryption key for decrypting the encrypted information encrypted by the encryption key, at least one of the encryption key and the decryption key being generated by applying a predetermined calculating operation to the secret information by the at least the second of the plurality of clients;
   transmitting the decryption key from the at least the second of the plurality of clients to the at least the first of the plurality of clients;

storing, by the at least the second of the plurality of clients, protected secret information obtained by encrypting the secret information with the encryption key in a secondary memory device; and decrypting the protected secret information by using the decryption key, thereby obtaining the secret information by the at least the second of the plurality of clients.

5. An information managing method for safely managing secret information between clients, and between clients and servers, over an object space in which at least one server for providing objects and at least one client requiring the objects are connected to one another by a network, comprising:

transmitting secret information from at least a first of a plurality of clients to at least a second of the plurality of clients;

transmitting, by the at least the second of the plurality of clients, a challenge character string to the at least the first of the plurality of clients;

applying a predetermined calculating operation to the challenge character string and the secret information, thereby generating an encryption key by the at least the first of the plurality of clients;

transmitting the encryption key from the at least the first of the plurality of clients to the at least the second of the plurality of clients; and storing, by the at least the second of the plurality of clients, protected secret information obtained by encrypting the secret information by using the encryption key in a secondary memory device.

* * * * *